United States Patent
Chanda et al.

(10) Patent No.: US 10,764,111 B2
(45) Date of Patent: *Sep. 1, 2020

(54) PREVENTING CONCURRENT DISTRIBUTION OF NETWORK DATA TO A HARDWARE SWITCH BY MULTIPLE CONTROLLERS

(71) Applicant: Nicira, Inc., Palo Alto, CA (US)

(72) Inventors: Anupam Chanda, San Jose, CA (US); Ariel Tubaltsev, Los Gatos, CA (US); HsinYi Shen, San Jose, CA (US); Hua Wang, Beijing (CN); Ziyou Wang, Beijing (CN); Jianjun Shen, Redwood City, CA (US); Pradeep Singh, Palo Alto, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/383,191

(22) Filed: Apr. 12, 2019

(65) Prior Publication Data

US 2019/0238393 A1    Aug. 1, 2019

Related U.S. Application Data

(63) Continuation of application No. 15/046,857, filed on Feb. 18, 2016, now Pat. No. 10,263,828.

(Continued)

(51) Int. Cl.
*H04L 12/24*        (2006.01)

(52) U.S. Cl.
CPC .......... *H04L 41/042* (2013.01); *H04L 41/044* (2013.01); *H04L 41/0813* (2013.01); *H04L 41/0873* (2013.01)

(58) Field of Classification Search
CPC ............... H04L 41/042; H04L 41/0873; H04L 41/0813; H04L 41/044
See application file for complete search history.

(56) References Cited

U.S. PATENT DOCUMENTS

| 5,526,484 A | 6/1996 | Casper et al. |
| 5,751,967 A | 5/1998 | Raab et al. |

(Continued)

FOREIGN PATENT DOCUMENTS

| EP | 1154601 A1 | 11/2001 |
| EP | 1653688 A1 | 5/2006 |

(Continued)

OTHER PUBLICATIONS

Non-Published Commonly Owned U.S. Appl. No. 16/403,493, filed May 3, 2019, 61 pages, Nicira, Inc.

(Continued)

*Primary Examiner* — Walli Z Butt
(74) *Attorney, Agent, or Firm* — Adeli LLP

(57) ABSTRACT

Some embodiments provide, for a first controller application, a method for configuring a managed hardware forwarding element (MHFE) to implement one or more logical networks. The method of some embodiments receives logical network data that defines at least one logical forwarding element of a logical network to be implemented by the MHFE. The method then identifies a set of tables of a database instance that is instantiated on the MHFE in order to distribute the logical network data to the MHFE. In some embodiments, the method monitors the identified set of tables in order to determine whether a second controller application updates any one of the set of tables. The method distributes the logical network data to the MHFE so long as none of the tables in the set of tables is updated by the second controller application.

20 Claims, 12 Drawing Sheets

Related U.S. Application Data

(60) Provisional application No. 62/235,530, filed on Sep. 30, 2015.

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 7,933,198 B1 | 4/2011 | Pan |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,178,833 B2 | 11/2015 | Koponen et al. |
| 9,306,843 B2 | 4/2016 | Koponen et al. |
| 9,319,375 B2 | 4/2016 | Gross et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 10,200,343 B2 | 2/2019 | Chanda et al. |
| 10,230,576 B2 | 3/2019 | Chanda et al. |
| 10,250,553 B2 | 4/2019 | Chanda et al. |
| 10,263,828 B2* | 4/2019 | Chanda ............... H04L 41/042 |
| 10,313,186 B2 | 6/2019 | Wang et al. |
| 10,411,912 B2 | 9/2019 | Chanda et al. |
| 10,447,618 B2 | 10/2019 | Chanda |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0052216 A1 | 3/2004 | Roh |
| 2004/0267866 A1 | 12/2004 | Carollo et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0147898 A1* | 6/2012 | Koponen ............... H04L 49/70 |
| | | 370/422 |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058208 A1 | 3/2013 | Pfaff et al. |
| 2013/0058225 A1 | 3/2013 | Casado et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1* | 5/2013 | Koponen ............ H04L 41/0893 |
| | | 370/255 |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1 | 12/2013 | Bao et al. |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2014/0362775 A1 | 12/2014 | Steiner et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0103838 A1 | 4/2015 | Zhang et al. |
| 2015/0124586 A1 | 5/2015 | Pani |
| 2015/0124809 A1 | 5/2015 | Edsall et al. |
| 2015/0124821 A1 | 5/2015 | Chu et al. |
| 2015/0195178 A1 | 7/2015 | Bhattacharya et al. |
| 2015/0215189 A1 | 7/2015 | Lim |
| 2015/0281075 A1 | 10/2015 | Park et al. |
| 2015/0326425 A1 | 11/2015 | Natarajan et al. |
| 2015/0372906 A1 | 12/2015 | Tirat |
| 2015/0379150 A1 | 12/2015 | Duda |
| 2016/0014039 A1 | 1/2016 | Reddy et al. |
| 2016/0014073 A1 | 1/2016 | Reddy et al. |
| 2016/0173535 A1 | 6/2016 | Barabash et al. |
| 2016/0197824 A1 | 7/2016 | Lin et al. |
| 2016/0212222 A1 | 7/2016 | Bultema et al. |
| 2016/0232019 A1 | 8/2016 | Shah et al. |
| 2016/0308690 A1 | 10/2016 | Chanda et al. |
| 2016/0352633 A1 | 12/2016 | Kapadia et al. |
| 2016/0380812 A1 | 12/2016 | Chanda et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 | 3/2017 | Uttaro et al. |
| 2017/0093758 A1 | 3/2017 | Chanda |

(56) References Cited

U.S. PATENT DOCUMENTS

| | | |
|---|---|---|
| 2017/0126615 A1 | 5/2017 | Chanda et al. |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1 | 7/2017 | Kirby et al. |
| 2017/0272316 A1 | 9/2017 | Johnson et al. |
| 2017/0317928 A1 | 11/2017 | Gude et al. |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1 | 1/2018 | Wang et al. |
| 2018/0183730 A1 | 6/2018 | Chanda |
| 2018/0219699 A1 | 8/2018 | Chanda et al. |
| 2018/0241622 A1 | 8/2018 | Chanda et al. |
| 2018/0241672 A1 | 8/2018 | Chanda et al. |
| 2018/0248796 A1 | 8/2018 | Chanda et al. |
| 2019/0089622 A1 | 3/2019 | Davie et al. |
| 2019/0141011 A1 | 5/2019 | Basler |
| 2019/0207904 A1 | 7/2019 | Chanda et al. |
| 2019/0260637 A1 | 8/2019 | Wang et al. |
| 2019/0356512 A1 | 11/2019 | Chanda et al. |

FOREIGN PATENT DOCUMENTS

| | | |
|---|---|---|
| JP | 2003069609 A | 3/2003 |
| WO | 2005112390 A1 | 11/2005 |
| WO | 2008095010 A1 | 8/2008 |

OTHER PUBLICATIONS

Al-Fares, Mohammad, et al., "A Scalable, Commodity Data Center Network Architecture," SIGCOMM '08, Aug. 17-22, 2008, 12 pages, Seattle, Washington, USA.

Graubner, Pablo, el al., "Cloud Computing: Energy-Efficient Visual Machine Consolidation," IT Professional, Mar. 2013, 7 pages, vol. 15, Issue 2, IEEE.

Non-Published Commonly Owned U.S. Appl. No. 16/240,654, filed Jan. 4, 2019, 65 pages, Nicira, Inc.

Non-Published Commonly Owned U.S. Appl. No. 16/294,891, filed Mar. 6, 2019, 39 pages, Nicira, Inc.

Pfaff, Ben, et al., "The Open vSwitch Database Management Protocol," draft-pfaff-ovsdb-proto-00, Aug. 20, 2012, 34 pages, Nicira, Inc., Palo Alto, California, USA.

Non-Published commonly owned U.S. Appl. No. 16/577,937, filed Sep. 20, 2019, 53 pages, Nicira, Inc.

\* cited by examiner

PREVENTING CONCURRENT DISTRIBUTION OF NETWORK DATA TO A HARDWARE SWITCH BY MULTIPLE CONTROLLERS

CLAIM OF BENEFIT TO PRIOR APPLICATIONS

This application is a continuation of U.S. patent application Ser. No. 15/046,857, filed Feb. 18, 2016, now published as U.S. Patent Publication 2017/0093646. U.S. patent application Ser. No. 15/046,857 claims the benefit of U.S. Provisional Patent Application 62/235,530, filed Sep. 30, 2015. U.S. patent application Ser. No. 15/046,857, now published as U.S. Patent Publication 2017/0093646, is incorporated herein by reference.

BACKGROUND

One of the challenges in today's hosting system networks is extending the virtual networks (e.g., of one or more tenants) to other physical networks through hardware switches (e.g., third party hardware switches). Having a central network controller communicate directly with one or more hardware switches (in order to configure and manage the switches) leaves the central controller subject to malicious network attacks. Additionally, direct communication with the hardware switches causes a negative affect on network scalability. Therefore, there is a need for an efficient architecture that allows the central network controller to configure and manage hardware switches in order to integrate these switches with one or more virtual networks.

BRIEF SUMMARY

Some embodiments provide one or more managed hardware forwarding element (MHFE) controllers each of which is responsible for managing a set of MHFEs (e.g., third-party hardware switches, routers, appliances, etc.) in order to integrate the MHFEs with one or more logical networks. In some embodiments, each MHFE controller serves as an intermediary between one or more central controllers in a central control plane (CCP) cluster and a set of one or more MHFEs. The CCP cluster of some embodiments computes the configuration and forwarding data for the logical networks and distributes these data to the MHFEs through the set of MHFE controllers.

Additionally, in some embodiments, the CCP cluster (e.g., a central controller in the CCP cluster) assigns each controller in the set of MHFE controllers as the master (primary) controller of a particular set of MHFEs. Each assigned master MHFE controller is responsible for distributing the logical network data (e.g., configuration and forwarding data) to the particular set of MHFEs (e.g., hardware switches). In this manner, the workload of configuring and managing several different hardware switches is divided between the master MHFE controllers. Sharding the physical management responsibilities across the master MHFE controllers also allows for easy scalability and high availability in some embodiments. That is, new hardware switches could be added to implement the logical networks by simply adding one or more new master MHFE controllers for the new hardware switches to efficiently handle the new physical workloads for the logical networks.

Each master MHFE controller of some embodiments uses (i) a first protocol to receive the logical network data from the CCP cluster and (ii) a second protocol to push the logical configuration and forwarding data to the hardware switches, for which, the MHFE controller is assigned as the master controller. In some embodiments, the CCP cluster communicates with the MHFE controller using a proprietary protocol (e.g., the NETCPA protocol) to distribute the logical network data to the MHFE controller. The MHFE controller of some such embodiments translates the received logical network data to a set of database transactions in an open source protocol (e.g., the open vSwitch database management (OVSDB) protocol). The MHFE controller then pushes down the set of database transactions to the hardware switches (e.g., third-party top of rack (TOR) switches) that the MHFE controller manages. In this manner, the MHFE controller enables the CCP cluster to efficiently configure and manage the hardware switches to implement the logical network or networks.

In some embodiments, when the physical mastership of an MHFE changes from a first MHFE controller to a second MHFE controller, there is a possibility that both of the first and second MHFE controllers simultaneously distribute the logical network data (i.e., database transactions) to the same MHFE (e.g., TOR switch). This transient condition (change of physical mastership), which lasts for a very brief period of time (e.g., few seconds), may occur under different circumstances. For instance, when the CCP cluster (e.g., a particular central controller in the CCP cluster) performs rebalancing of the workload of the MHFE controllers, the mastership of one or more MHFEs may be switched from one MHFE controller to another.

Specifically, in some embodiments, a balancing central controller in the CCP cluster is responsible for maintaining the workload of the MHFE controllers as balanced as feasibly possible. The balancing central controller of some such embodiments, under certain circumstances, takes the mastership responsibility away from an MHFE controller that is the master controller of one or more MHFEs and assigns another MHFE controller (or controllers) as the new master of the MHFEs. An example circumstance is when a new hardware switch is added to the system to implement one or more logical networks. Another example circumstance, under which the mastership of MHFE controllers changes, is when an existing hardware switch is removed from the system (i.e., the physical workload on the switch is not connected to the logical networks anymore).

In some embodiments, the central controller (that is responsible for the mastership assignments) sends (i) a message to the first MHFE controller informing the controller of not being the master of one or more MHFEs, and (ii) another message to the second controller informing the controller of the new mastership assignment. However, in the physical network, there is no guaranty that the two MHFE controllers receive these messages at the same time. Therefore, there is always a possibility that for a brief period of time (i.e., during the transient condition), each of the two MHFE controllers determines that it is the master of the same MHFE. When such transient condition occurs, both MHFE controllers push database transactions down to the same MHFE, which results in instability in forwarding state of the MHFE.

In some embodiments, each MHFE controller sets up a mechanism to detect concurrent distribution of network data and to prevent further instability in the forwarding state. As stated above, the MHFE controller pushes down the logical network data to a hardware switch in form of database transactions using, for example, the OVSDB protocol. In some embodiments, a database transaction includes any type of transaction that modifies the data in a database table (e.g., adds a record to the table, updates a record in the table, etc.). These database transactions are applied (committed) to one or more tables of a database instance that is instantiated on the hardware switch using a database schema (e.g., hardware VXLAN tunnel endpoint (VTEP) database schema, OVSDB schema, etc.).

In order to prevent concurrent writings to the same database instance (e.g., by two different controllers), each MHFE controller of some embodiments monitors the tables of the database instance for any modification of data in the tables. Some embodiments set all of the tables of the database instance to be monitored, while some other embodiments only set monitors for the tables that might be updated by the distributed database transactions. Some embodiments determine which tables of the database instance might be modified based on the logical network data that the MHFE controller receives from the CCP cluster.

In some embodiments, the MHFE controller buffers each database transaction before the controller pushes down the database transaction to the hardware switch. In some such embodiments, the database transactions are buffered as separate records in a local storage of the MHFE controller (e.g., a data storage that is on the same controller machine that executes the controller application). When the data in a monitored table of the database instance is changed (e.g., one of the records of the monitored table is updated), the MHFE controller receives a monitor update from the database instance of the hardware switch. The MHFE controller receives these monitor updates asynchronously in some embodiments. That is, because of the physical network delays, the MHFE controller might buffer and distribute a few database transactions before the controller receives a monitor update confirming that the first transaction has been committed.

The monitor update that is received from the hardware switch includes the database transaction that has triggered the monitor (i.e., the database transaction by which the monitored table is updated) in some embodiments. The MHFE controller of some embodiments compares each received monitor update against the records stored in the local storage (i.e., the database transactions that are buffered in the local storage). When the MHFE controller finds a match, the MHFE controller removes the record from the local storage. However, when no match is found, the MHFE controller determines that a transient condition has occurred and the master MHFE controller and another MHFE controller (i.e., a second master controller) are updating the database instance simultaneously.

In some embodiments, the MHFE controller removes a database transaction from the local storage when the received monitor update matches the database transaction, irrespective of the database instance being updated by the MHFE controller that has received the monitor update, or by another controller. This is because the committed transaction is the same transaction that the MHFE controller has originally pushed down to the hardware switch and therefor the identity of the MHFE controller that has updated the database instance becomes irrelevant. In other words, when two MHFE controllers have pushed down the same database transaction to the hardware switch, it is not important which MHFE controller has updated the hardware switch.

In some embodiments, when the master MHFE controller realizes that a transient condition has occurred (i.e., a second controller is concurrently writing on the same MHFE), the master controller halts the distribution of logical network data to the hardware switch for a predetermined period of time. As described above, the transient condition lasts only few seconds. As soon as both of the controllers physically receive their corresponding mastership assignment messages from the central controller, each controller knows whether it is the master of the MHFEs or not. Therefore, during the transient condition, each controller ceases distributing data transactions for a predetermined period and only buffers the database transactions.

In some embodiments, the MHFE controller uses an exponential back off mechanism during the predetermined time period. That is, the MHFE controller of some embodiments stays idle for different time periods within a predetermined amount of time. Before switching from one idle state to the next, the MHFE controller determines again whether the MHFE is still being updated by another controller. In order to determine the waiting time in each idle state, in some embodiments, the MHFE controller uses the result of an exponentiation in which a particular integer (e.g., number 2) is the base and an integer n (n being from 0 to a threshold number) is the exponent.

Therefore in some such embodiments, the MHFE controller initially halts pushing down the database transactions to the MHFE for one second ($2^0$). If the MHFE controller determines that another controller is still updating the MHFE, the controller continues on halting the distribution (i.e., staying idle) for a second period of time (e.g., 2 seconds which is $2^1$). In some embodiments, the controller continues this wait and check mechanism within a threshold cap time (e.g., 8 second, 16 seconds, etc.). During this transient condition, the controller that is not supposed to be the master controller receives the corresponding message from the central controller indicating the same. In some embodiments, if the controller does not receive the message during the threshold period, the controller determines that it is not the master of the MHFEs and stops delivering more transactions to the MHFEs.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1A:
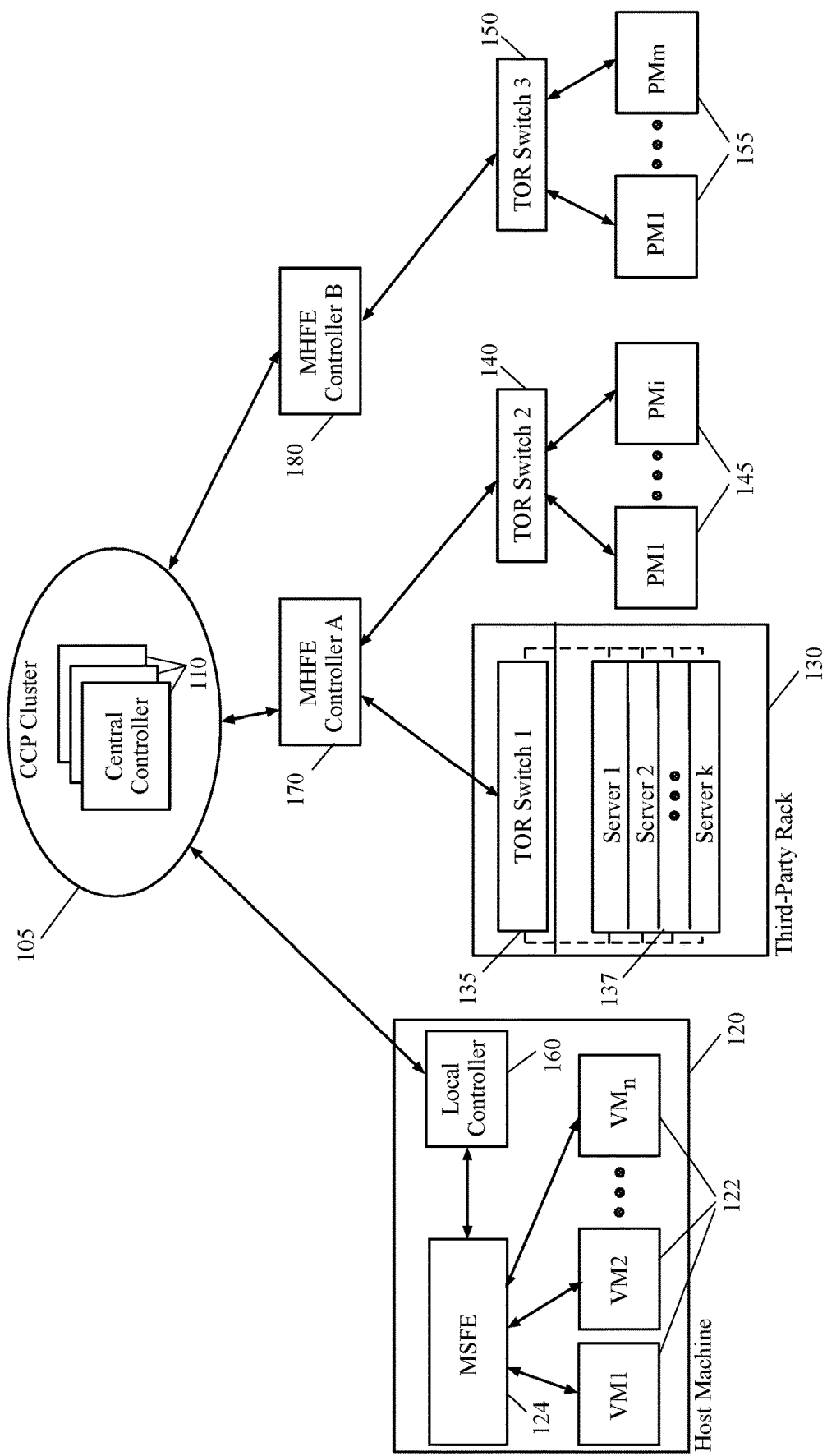
FIGS. 1A-1B illustrate change of mastership of a TOR switch from a first MHFE controller to a second MHFE controller in order to maintain the workload balanced between the MHFE controllers.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide one or more managed hardware forwarding element (MHFE) controllers each of which is responsible for managing a set of MHFEs (e.g., third-party hardware devices such as top of rack (TOR) hardware switches, routers, appliances, etc.) in order to integrate the MHFEs with one or more logical networks. In some embodiments, each MHFE controller serves as an intermediary between one or more central controllers in a central control plane (CCP) cluster and one or more MHFEs. The CCP cluster of some embodiments computes the configuration and forwarding data for the logical networks and distributes these data to the MHFEs through the set of MHFE controllers.

The CCP cluster of some embodiments configures and manages one or more logical networks for one or more tenants of a hosting system (e.g., a datacenter). In some embodiments, a logical network of the hosting system logically connects different end machines (e.g., virtual machines, physical servers, containers, etc.) through a set of logical forwarding elements (e.g., different L2 and L3 logical switches). Some of the end machines (e.g., the virtual machines, containers, etc.) reside on host machines that execute managed software forwarding elements (MSFE), which implement the logical forwarding elements of the logical network to which the local end machines are logically connected. In other words, each of the host machines executes an MSFE that processes packets sent to and received from the end machines residing on the host machine, and exchanges these packets with other hardware and software managed forwarding elements (e.g., through tunnels). The MSFE of some embodiments is a software instance that is implemented in the virtualization software (e.g., a hypervisor) of the host machine.

In order to configure and manage a logical network, the CCP cluster distributes logical network data (e.g., forwarding tables) to a local controller that operates on the same host machine as the MSFE. The local controller of some embodiments is also implemented in the virtualization software of the host machine. The local controller of the host machine then converts the logical forwarding data that it receives from the central controller to physical forwarding data, which can be recognized and used by the MSFE operating on the host machine to implement the set of logical forwarding elements.

In some embodiments, the CCP cluster (e.g., a central controller in the CCP cluster) also assigns each controller in the set of MHFE controllers as the master (primary) controller of a particular set of MHFEs. Each assigned master MHFE controller is responsible for distributing the logical network data (e.g., configuration and forwarding data) to the particular set of MHFEs (e.g., hardware switches). In this manner, the workload of configuring and managing several different hardware switches is divided between the master MHFE controllers. Sharding the physical management responsibilities across the master MHFE controllers also allows for easy scalability in some embodiments. That is, new hardware switches could be added to implement the logical networks by simply adding one or more new master MHFE controllers for the new hardware switches to efficiently handle the new physical workloads for the logical networks.

Figure 1B:
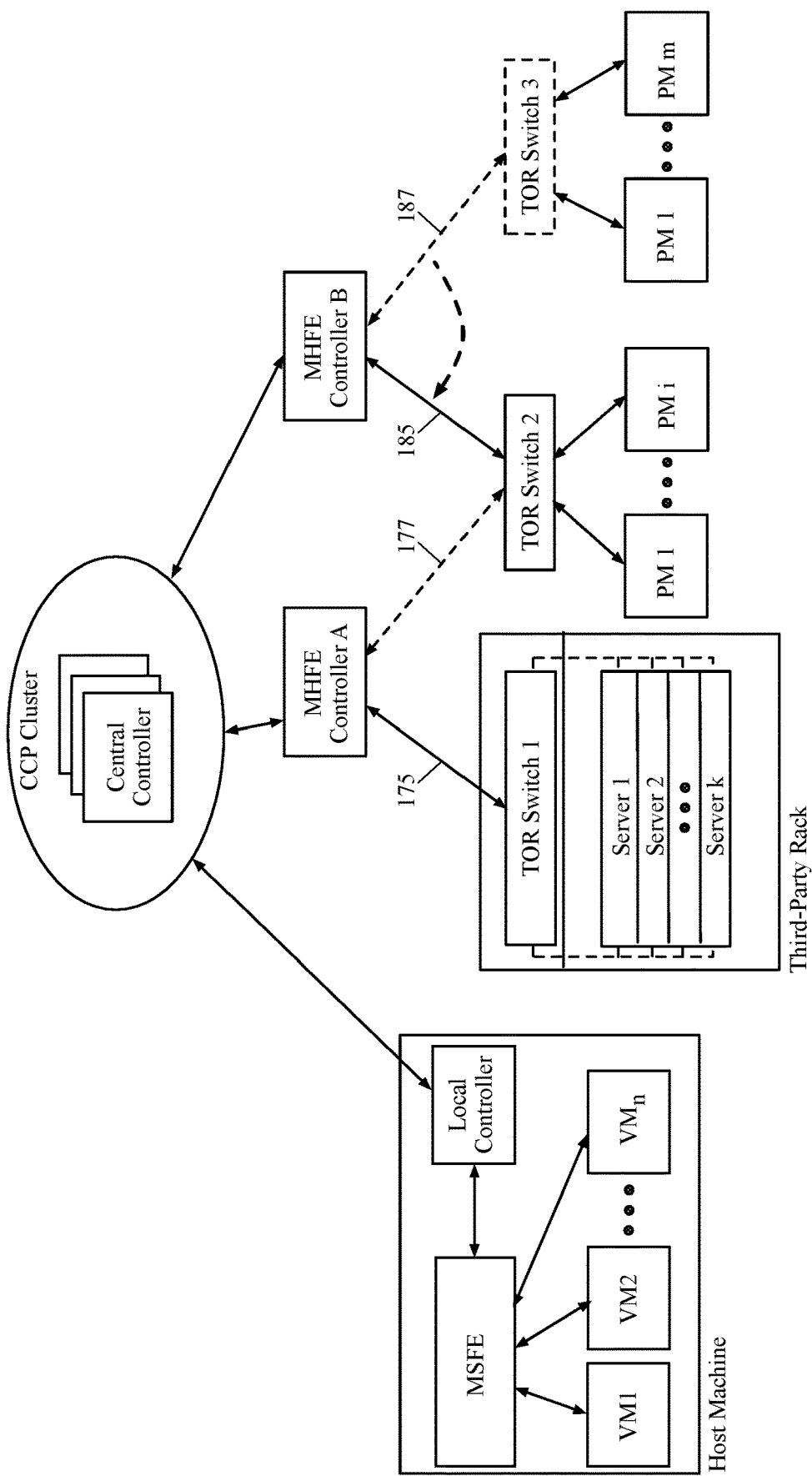

FIGS. 1A-1B illustrate change of mastership of a TOR switch from a first MHFE controller to a second MHFE controller in order to maintain the workload balanced between the MHFE controllers. This figure shows a central control plane (CCP) cluster 105, a host machine 120, a third-party rack 130 with a top of rack (TOR) switch 135, and two other TOR switches 140 and 150. The CCP cluster 105 includes several central controllers 110 that are responsible for (i) receiving logical networks' configuration data for different tenants of the hosting system (e.g., from a network administrator), and (ii) distributing the logical configuration and forwarding data for the managed forwarding elements to implement the logical switches of the logical networks.

The host machine 120 includes a managed software forwarding element (MSFE) 124, a local MSFE controller 160 and a set of compute nodes (e.g., end machines) 122 (in this example, virtual machines VM1-VMn). As stated above, in some embodiments the MSFE 124 is implemented in the virtualization software (e.g., hypervisor) of the host machine 120. The TOR switch 135 of the third-party rack 130 is connected to a set of servers 137. The TOR switch 140 is connected to a set of physical machines 145 (physical machines PM1-PMi), while the TOR switch 150 is connected to another set of physical machines 145 (physical machines PM1-PMm). Additionally, FIG. 1A shows that the MHFE controller 170 is connected to the TOR switches 135 and 140 and is the master of these two switches, while the MHFE controller 180 is the master of TOR switch 150.

The end machines 122, the servers 137, and other physical machines 145 and 155 communicate with each other and other network entities via one or more logical networks, to which they are connected through the MSFE 124 and TOR switches 1-3, respectively. One of ordinary skill in the art would realize that the number of the host machines, third-party racks, and TOR switches illustrated in the figure are exemplary and only to simplify the description. Otherwise, a logical network for a tenant of a hosting system may span a multitude of host machines and third-party devices, and logically connect a large number of end machines to each other and to several other third-party devices. Also, in order to show that the machines that can be connected to a TOR switch are not necessarily only servers in a third-party rack, other physical devices (e.g., computing devices such as computers, printers, etc.) are illustrated as physical machines that are connected to the logical networks through the TOR switches 140 and 150.

The CCP cluster 105 communicates with the MSFE 124 on the host machine 120 through the MSFE controller 160 in order to implement and manage the logical networks that logically connect different sets of end machines operating on the host machine 120 to different sets of end machines that operate on other host machines (not shown) and other machines that are connected to the TOR switches. The CCP cluster 105 also communicates with the TOR switches 1-3 through the MHFE controllers 170 and 180 in order to implement the logical networks on the TOR switches A-B and connect one or more of the physical machines 145 and 155 to each other and to other end machines connected to the logical networks.

In some embodiments, the MSFE controller 160 of the host machine receives logical network data from a central controller 110 of the controller cluster 105. The MSFE controller 160 then converts and customizes the received logical network data for the local MSFE 124 and sends the converted data to the MSFE. The MSFE 124 implements a set of logical forwarding elements (LFEs) in a logical network that is assigned to a tenant based on the received customized data. The set of logical forwarding elements (not shown) logically connects one or more of the end machines that reside on the same host machine on which the MSFE operates to each other and to other end machines that are in the logical netwrok. The logically connected end machines of the host machine, together with other logically connected end machines (operating on other host machines or connected to other hardware switches) create a logical network topology for the tenant of the hosting system.

As an example, some of the end machines (e.g., VM1, server 1, etc.) are logically connected to each other through a logical switch (not shown) that is implemented by some of the managed forwarding elements (e.g., MSFE, TOR switch 1, etc.). The connections of the end machines to the logical switch (as well as the connections of the logical switch to other logical switches such as a logical router) are defined using logical ports, which are mapped to the physical ports of the managed forwarding elements. In some embodiments, the LFEs (logical routers and switches) of a virtual network are implemented by each managed forwarding element (MFE) of the managed virtual network. That is, in some such embodiments, when the MFE receives a packet from an end machine that is coupled to the MFE, it performs the processing for the logical switch to which that end machine logically couples, as well as the processing for any additional LFE (e.g., logical router processing if the packet is sent to an external network, logical router processing and processing for the other logical switch in the network if the packet is sent to an end machine coupled to the other logical switch, etc.).

In some embodiments, the MSFEs implement the LFEs through a set of flow entries. These flow entries are generated by a local controller operating on each host machine (e.g., the local controller 160). The local controller generates the flow entries by receiving the logical forwarding data from the CCP cluster and converting the logical forwarding data to the flow entries for routing the packets of the logical network in the host machine. That is, the local controller converts the logical forwarding data to a customized set of forwarding behaviors that is recognizable and used by the MSFE to forward the packets of the logical network between the end machines operating on the host machine. In other words, by using the generated flow entries, the MSFEs are able to forward and route packets between network elements of the logical network that are coupled to the MSFEs.

In some embodiments, however, some or all of the MSFEs are not flow-based software forwarding elements, but instead process packets based on configuration data that is generated by their respective local controllers. In some embodiments, the local controllers receive the same data from the CCP cluster irrespective of the type of MSFEs they manage, and perform different data conversions for different types of MSFEs. Even though, in the described example, each MFE implements the same logical forwarding element that is assigned to a particular tenant, one tenant may have many more LFEs (e.g., logical L2 and L3 switches) assigned to it. Also, because the end machines operating on a particular host machine or connected to a particular TOR switch may belong to more than one logical network (e.g., some of the machines belong to a first tenant while other machines belong to a second tenant), each MFE (MSFE and MHFE) may implement different logical forwarding elements that belong to different logical networks.

Additionally, the CCP cluster distributes the logical network data to implement the LFEs to the TOR switches in order for the TOR switches to implement these LFEs and to connect the machines that are connected to these switches to other end machines. As described above, the CCP cluster of some embodiments does so by distributing the logical network data to each MHFE through a first protocol to be subsequently distributed to one or more TOR switches through a second, different protocol.

As illustrated in this example, in some embodiments, each of the MHFE controllers A-B is a separate software process from the central controllers of the CCP cluster. In different embodiments, an MHFE controller may operate on the same machine as one of the CCP cluster controllers, or on a different machine. For example, in FIGS. 1A-1B, the MHFE controllers A-B operate on separate machines (e.g., on a separate virtual machine, on a separate physical device, etc.) from the machines of the CCP cluster. The different implementations of MHFE controllers and how they receive and distribute logical network data are described in greater detail in the U.S. patent application Ser. No. 14/836,802, filed Aug. 26, 2015, now issued as U.S. Pat. No. 10,554,484, which is incorporated herein by reference.

FIG. 1A illustrates that the CCP cluster 105 communicates with the MFHE controllers 170 and 180 in order to push the logical forwarding data to the TOR switches 1-3 and extend the logical networks to the set of servers and physical machines that are connected to these TOR switches. One of ordinary skill in the art would realize that, in some embodiments, any of the illustrated TOR switches could be replaced by any other third-party physical device (e.g., an appliance such as a firewall, a load balancer, etc.) that is capable of communication with the MHFE controllers through an open source protocol.

As discussed above, an MSFE controller that operates on a host machine receives the logical forwarding data of a logical network from the CCP cluster and generates the necessary flow entries (or other configuration data) for the MSFE of the host machine to implement one or more LFEs (e.g., logical L2 switches, logical L3 routers, etc.). However, a third-party hardware device does not necessarily have the required platform, operating system, or applications to run or execute a controller process and/or application similar to the MSFE controller 160.

Hence, some embodiments provide an MHFE controller that configures and manages one or more TOR switches (or other third-party devices) in a similar fashion that the MSFE controller configures and manages the MSFE. That is the MHFE controller of some such embodiments receives the logical network data from the CCP cluster through a first protocol (e.g., a proprietary protocol such as NETCPA) and translates the network data to instructions (e.g., database transactions) that are recognizable by the TOR switch in a second protocol (e.g., an open source protocol such as OVSDB).

After receiving the logical network configuration data from the MSFE and MHFE controllers, the MSFEs and the TOR switches establish tunnels (e.g., a Virtual Extensible LAN (VXLAN) tunnel, a Stateless Transport Tunneling (STT) tunnel, etc.) between themselves (e.g., a full mesh of tunnels between all of the configured forwarding elements that implement the logical network) in order to exchange the logical network packets between the endpoints that are coupled to the MSFEs and the TOR switches. Establishing tunnels between different managed forwarding elements of a logical network is described in more detail below by reference to FIG. 2.

As described above, in some embodiments, a balancing central controller 110 in the CCP cluster 105 is responsible for maintaining the workload of the MHFE controllers as balanced as feasibly possible. The balancing central controller of some such embodiments, under certain circumstances, takes the mastership responsibility away from an MHFE controller that is the master controller of one or more MHFEs and assigns another MHFE controller (or controllers) as the new master of the MHFEs. An example circumstance is when a new hardware switch is added to the system to implement one or more logical networks. Another example circumstance, under which the mastership of MHFE controllers changes, is when an existing hardware switch is removed from the system (i.e., the physical workload on the switch is not connected to the logical networks anymore).

In some embodiments, when the physical mastership of an MHFE changes from a first MHFE controller to a second MHFE controller, there is a possibility that both of the first and second MHFE controllers distribute the logical network data (i.e., database transactions) to the same MHFE concurrently. This transient condition (change of physical mastership), which lasts for a very short period of time (e.g., few seconds), may occur under different circumstances. For instance, when the CCP cluster (e.g., a particular central controller in the CCP cluster) performs rebalancing of the workload of the MHFE controllers, the mastership of one or more MHFEs may be switched from one MHFE controller to another.

FIG. 1B, illustrates the same network architecture as was illustrated in FIG. 1A. However, in this figure, TOR switch 150 (TOR switch 3) which is connecting the physical machines 155 to the logical network(s) has stopped operating. A TOR switch or any other managed forwarding element may cease operating for different reasons. One example of a TOR switch ceasing to operate is when one of the physical machines connected to the TOR switch maliciously generates an excessive number of transactions (e.g., in a denial of service (DoS) or a distributed denial of service (DDoS) attack), which disables the TOR switch. Another example is when the TOR switch is simply turned off or shut down.

As a result of the TOR switch 3 getting disconnected from the network, the MHFE controller A would become a master controller for two TOR switches 135 and 140, while the master controller B has no more TOR switches to manage. When the workload assigned to each controller is not balanced, the CCP cluster of some embodiments starts rebalancing the workload between the MHFE controllers. That is, a particular central controller in the CCP cluster takes away some of the workload of the controller that is handling more physical workload (e.g., more number of physical machines are connected to the logical networks through the hardware switches that the controller manages), and reassigns the workload to another controller with less (or none) physical workload.

In the illustrated example, as stated above, the MHFE controller A is the master of TOR switches 1-2 and manages these two switches, while the MHFE controller B does not manage any TOR switch after the TOR switch 3 is disconnected. As such, in order to maintain the balance between the two MHFE controllers A-B, the CCP cluster (a central controller in the cluster) reassigns the mastership and management of the TOR switch 2 to the MHFE controller B. This is shown in the figure by the solid line 185 that connects the MHFE controller B to the TOR switch 2. Additionally, the dashed-line 187 shows that there is no more connection between the MHFE controller B and the TOR switch 3. The CCP cluster has further taken away the mastership of the TOR switch 2 from the MHFE controller A. The dashed-line 177 shows that there is no more connection between the MHFE controller A and the TOR switch 2, while the solid line 175 shows that the MHFE controller A is currently the master controller of only TOR switch 1. Therefore, after rebalancing the workload, each of the MHFE controllers is master of only one TOR switch.

It should be understood that the numbers of MHFE controllers and TOR switches in the illustrated figures are exemplary and in real networks these numbers could be completely different. For example, the central controller of the CCP cluster that is responsible for maintaining the workload balanced between the different MHFE controllers does not start rebalancing until the number of the TOR switches connected to the controller reaches a maximum threshold (e.g., 5 TOR switches). Additionally, in some embodiments, the central controller performs the rebalancing process periodically and irrespective of addition or deletion of the TOR switches to or from the system.

When the physical mastership of the TOR switch 2 changes from the MHFE controller # A to the MHFE controller B, there is a chance that for a very short period of time both of these MHFE controllers distribute the logical network data (i.e., database transactions) to the same TOR switch 2 at the same time. As will be discussed in further detail below, if a concurrent writing on the TOR switch 2 occurs, some embodiments provide a mechanism to the MHFE controllers A and B to be able to (i) detect such a transient condition, and (ii) avoid concurrent writing on the TOR switch which results in instability of the network.

As described above, the CCP cluster of some embodiments configures and manages a set of logical forwarding elements for different logical networks implemented in the hosting system (e.g., for different tenants of the hosting system). That is, the CCP cluster of some such embodiments computes, generates, and distributes logical forwarding data for one or more logical networks that belong to one or more tenants of the hosting system. The CCP cluster also configures and manages third-party hardware forwarding elements such as third-party TOR switches in order to extend one or more of the logical networks to the physical workloads on the TOR switches.

In some embodiments, the central controller application computes and delivers the logical forwarding data (of a logical network) to the MHFE controller application through a first proprietary protocol (e.g., NETCPA). The MHFE controller application then translates this data in a second open source protocol (e.g., OVSDB) and delivers the translated data to the TOR switches that are managed by the MHFE controller. Using the logical forwarding data, the TOR switches are configured to process packets according to the logical forwarding tables of the logical forwarding elements managed by the CCP cluster, and send these packets to other TOR switches and MSFEs via overlay tunnels.

Figure 2:
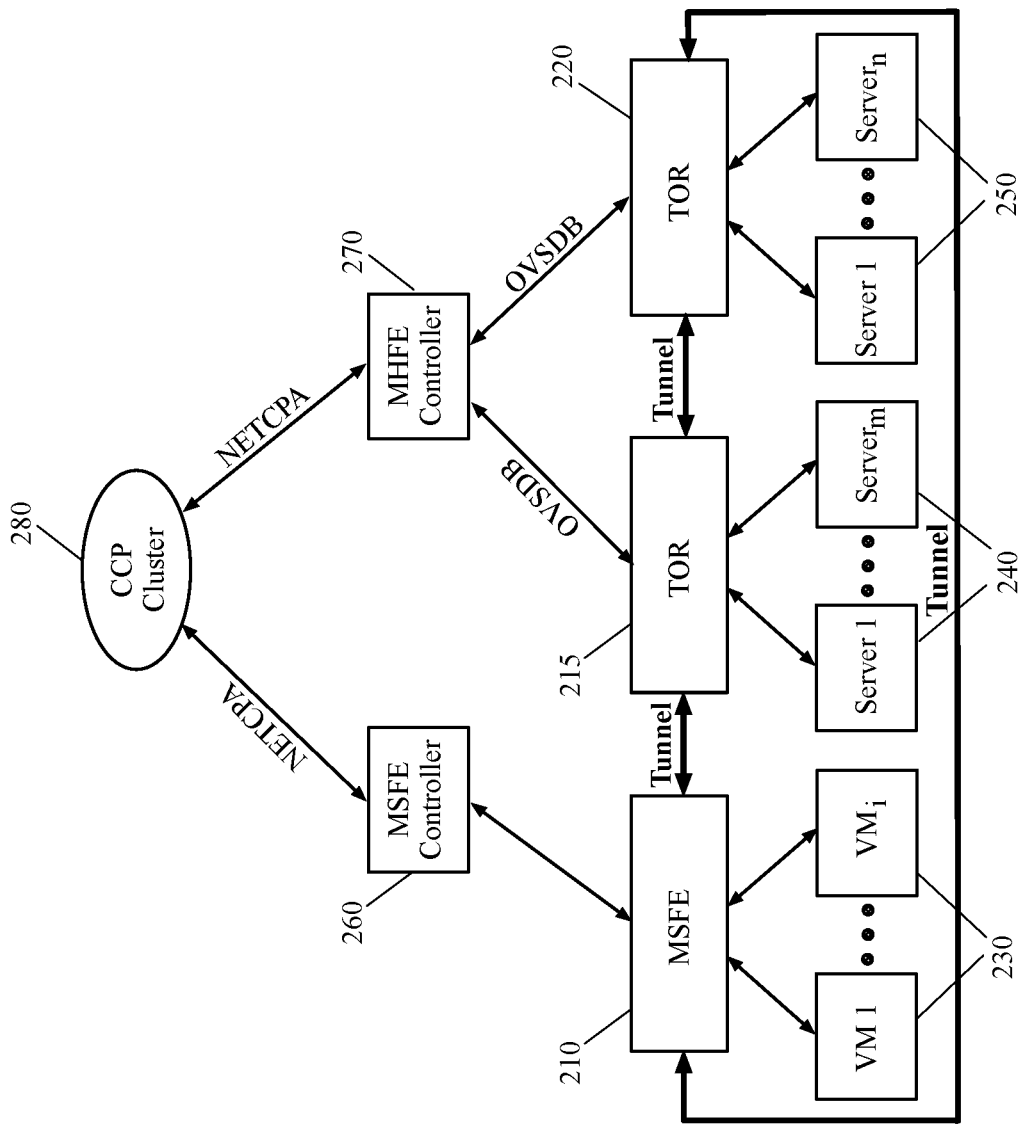
FIG. 2 illustrates an example of how the CCP cluster of some embodiments communicates with several managed forwarding elements (hardware and software) in order to implement one or more logical networks.

FIG. 2 illustrates an example of how the CCP cluster of some embodiments communicates with several managed forwarding elements (hardware and software) 215-225 to implement one or more logical networks. Specifically, this figure shows a CCP cluster 280 exchanging logical forwarding and configuration data with the managed forwarding elements to implement one or more logical forwarding elements and create tunnels between the various managed software and hardware forwarding elements.

In some embodiments one or more controllers of the CCP cluster 280 manage and configure the MSFE 210 through the MSFE controller 260 (also referred to as a local controller) to implement one or more logical forwarding elements of the logical network to which the virtual machines 230 connect. As described above, each pair of MSFE controller and MSFE of some embodiments operates on one host machine (e.g., in the virtualization software of the host machine). In addition, the controllers of the CCP cluster 280 manage and configure the TOR switches 215 and 220 through the MHFE controller 270 to implement one or more logical forwarding elements of the logical network to which the servers 240 and 250 connect.

As shown, the controllers of the CCP cluster communicate with the MSFE controller agents using the NETCPA protocol, which is a proprietary protocol (a Virtual Extensible LAN (VXLAN) control plane protocol), in order to distribute the logical forwarding data to the MSFE controllers. The CCP cluster of some such embodiments also communicates to the MHFE controller using the same proprietary protocol to distribute the logical forwarding data to the MHFE controller. The MHFE controller 270 then communicates with the MHFEs 215 and 220 using a different protocol. In some embodiments, the MSFE controllers use the OpenFlow protocol to distribute the converted forwarding tables to the MSFE (e.g., as a set of flow entries) and a database protocol (e.g., the OVSDB protocol) to manage the other configurations of the MSFE, including the configuration of tunnels to other MFEs. In some other embodiments the MSFE controller 270 uses other protocols to distribute the forwarding and configuration data to the MSFE (e.g., a single protocol for all of the data or different protocols for different data).

In the illustrated example, the CCP cluster 280 communicates with the MSFE controller 260 using the NETCPA protocol. That is, the CCP cluster computes the logical forwarding data necessary for implementing the logical networks on the MSFE 215. The CCP cluster then pushes the computed logical forwarding data down to the MSFE controller 260 through the NETCPA protocol. The MSFE controller 260 then converts the logical forwarding data that it receives from the CCP cluster to physical forwarding data for the MSFE 210 (which resides on the same host machine that the MSFE controller does). The physical forwarding data includes (1) data (e.g., a table with physical flow entries) for the MSFE to implement the required set of logical forwarding elements for packets sent to and from the virtual machines that connect to the MSFE and (2) data to encapsulate these packets in tunnels in order to send the packets to other MFEs (hardware and software).

The logical data of some embodiments includes tables that map addresses to logical ports of logical forwarding elements (e.g., mapping MAC addresses of virtual machines or servers to logical ports of logical switches, mapping IP subnets to ports of logical routers, etc.), routing tables for logical routers, etc. In addition, the logical data includes mappings of the logical ports to physical locations (e.g., to MSFEs or MHFEs at which the machines connected to a logical port is located). In some embodiments, the MSFE controller converts this logical data into a set of flow entries that specify expressions to match against the header of a packet, and actions to take on the packet when a given expression is satisfied. Possible actions include modifying a packet, dropping a packet, sending it to a given egress port on the logical network, and writing in-memory metadata (analogous to registers on a physical switch) associated with the packet and resubmitting the packet back to the logical network for further processing. A flow expression can match against this metadata, in addition to the packet's header.

Different from the MSFE controller 260, the MHFE controller 270 of some embodiments communicates with the third-party devices using a different protocol that these devices (e.g., third-party TOR switches) can recognize. This protocol in some embodiments is an open source protocol (e.g., the OVSDB protocol, border gateway protocol (BGP), etc.), which requires minimal software to run on the third-party device to enable the device to communicate with the controller and implement the logical networks as needed. In other words, the MHFE controller of some embodiments receives a set of logical forwarding data through the proprietary protocol and translates this data to a set of instructions (e.g., database transactions) in an open source protocol (OVSDB) which is recognizable by the third-party devices (e.g., TOR switches) that the MHFE controller manages (or is a master of).

In the illustrated example, the CCP cluster 280 communicates with the MHFE controller 270 using the NETCPA protocol (the same way it communicates with the MSFE controller 260). The MHFE controller, as shown, communicates with the MHFEs (i.e., the TOR switches 225 and 230) using the OVSDB protocol. Through the OVSDB protocol, the MHFE controller 270 reads the configurations of the physical switches (e.g., an inventory of their physical ports) and sends the logical forwarding and configuration data to the hardware switches.

For example, the MHFE controller 270 sends instructions to the hardware switches 225 and 230 through OVSDB protocol to implement the forwarding tables of the logical network. The MHFE controller of some embodiments (i) generates the instructions for each TOR switch as a set of database transactions and (ii) updates the tables of a databases instance that is instantiated on each TOR switch with the corresponding generated set of database transactions. In some embodiments, a database transaction includes any type of transaction that modifies the data in a database table (e.g., adds a record to the table, updates a record in a table, etc.)

The hardware switches 225 and 230 can then convert the received data in their tables into their own format to be used to process packets received from and sent to the servers 240 and 250, respectively.

In some embodiments, the MHFE controller 270 communicates with the hardware switches 215 and 220 over the OVSDB protocol to exchange forwarding state (e.g., L2 and/or L3 forwarding state) with these switches. For instance, the physical switch 215 might send an update notification to the CCP cluster (through the MHFE controller) regarding a learned MAC address of a machine (e.g., desktop computer, laptop) that is connected to one of its ports. The CCP cluster can then compute the necessary logical data and push this logical data down to the MSFE controller using the NETCPA protocol. The CCP cluster might also send to the hardware switch 215, through the MHFE controller 270, the MAC addresses of the virtual machines 230 that are coupled to the MSFE 210. The hardware switch 215 of some such embodiments then calculates its own forwarding data based on the forwarding information it receives from the CCP cluster. The method of computation of the forwarding data by a physical switch can vary from one switch vendor to another.

In some embodiments, the CCP cluster 280 also exchanges management data with the MFE controllers using the NETCPA protocol. In some embodiments, the MSFE controller uses the same or different protocol (e.g., OVSDB protocol) to deliver the management data to the MSFE. The management data of some embodiments includes instructions on how to set up tunnels between the managed software and hardware forwarding elements. For instance, each of the TOR switches serves as a tunnel endpoint in some embodiments, and receives addresses (e.g., IP addresses) of the other tunnel endpoints, as well as other information (e.g., logical network and logical port identifiers, etc.) to use when encapsulating packets in the tunnels. The CCP cluster uses the NETCPA protocol to send this data to the MHFE controller in some embodiments, and the MHFE controller uses the OVSDB protocol to translate the data to a set of configuration database transactions for each TOR switch to create an overlay tunnel (e.g., a VXLAN tunnel, an STT tunnel, etc.) between itself and each of the other MFEs (software and hardware) that implements the logical network.

As described above, scalability and high availability are some of the important benefits of separating the MHFE controllers from the CCP cluster. In some embodiments, the MHFE controller for a particular third-party device may receive logical forwarding data for the particular third-party device from multiple central controllers of the CCP cluster. Some embodiments shard the responsibility for computing and generating the logical forwarding data across multiple central controllers in the CCP cluster, with each central controller being responsible for a particular set of logical forwarding elements (e.g., logical routers, logical switches, etc.). Thus, if a particular third-party device implements logical forwarding elements managed by different central controllers, its master MHFE controller will receive data from these different central controllers of the CCP cluster.

(1) Sharding the physical management responsibilities across different MHFE controllers (i.e., assigning the mastership of each particular set of MHFEs to a particular MHFE controller), and (2) sharding the logical responsibilities (of different sets of logical forwarding elements) across different central controllers of the CCP cluster, allow for easy scalability and high availability in some embodiments. That is, new third-party devices could be added to implement the logical networks by simply adding one or more new MHFE controllers for the new third-party devices to efficiently handle the new workload.

Figure 3:
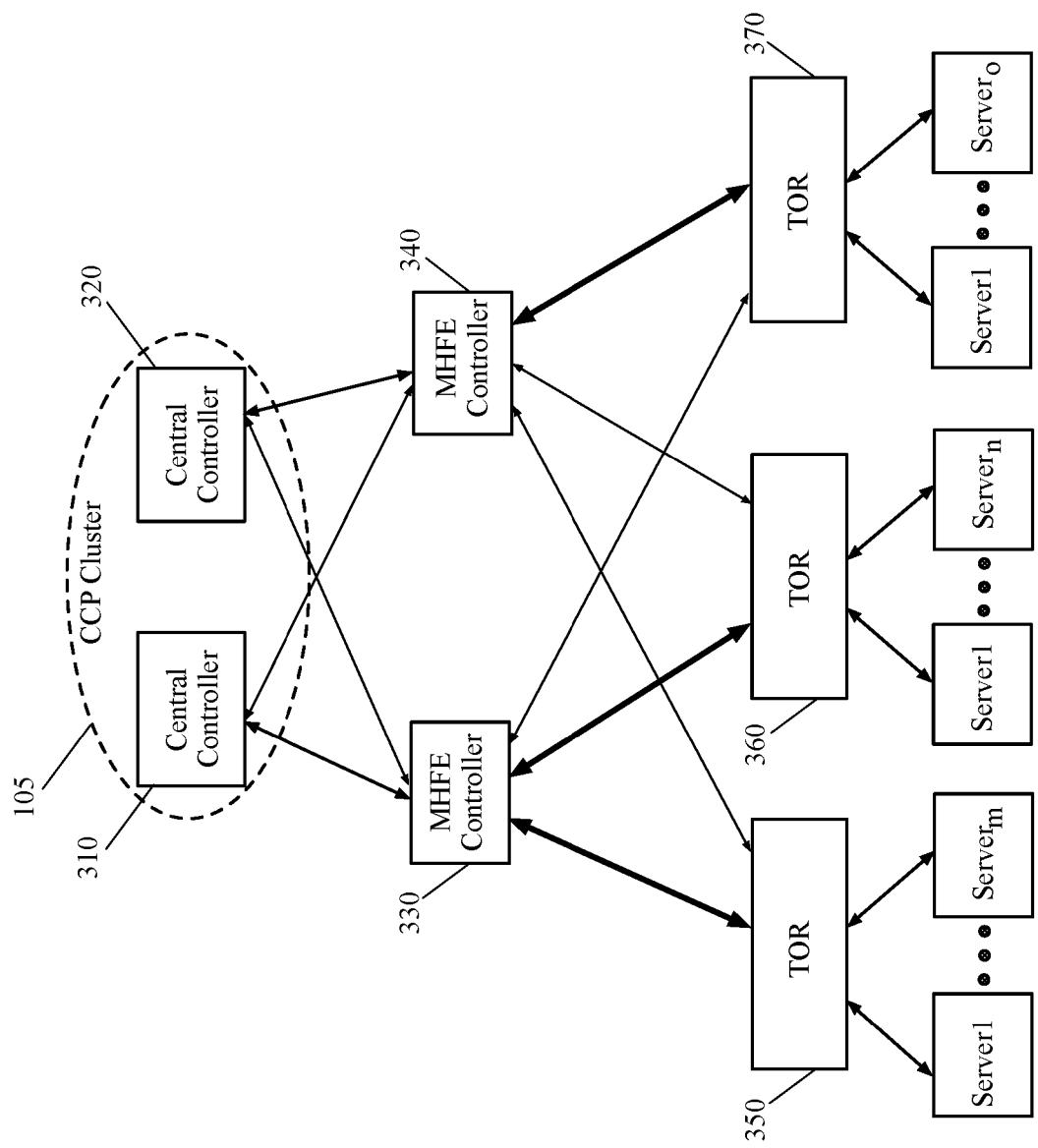
FIG. 3 illustrates different master MHFE controllers of some embodiments that are responsible for different sets of third-party devices.

FIG. 3 illustrates different master MHFE controllers of some embodiments that are responsible for different sets of third-party devices. Specifically, this figure shows that two central controllers 310 and 320 of the CCP cluster 105 communicate with two master MHFE controllers 330 and 340 in order to configure and manage the TOR switches 350-370 in one or more logical networks. The logical forwarding data for implementing different sets of logical forwarding elements on these TOR switches has been sharded between the two central controllers (e.g., during the configuration of the CCP cluster by a network administrator).

In the illustrated example, the central controller 310 is the primary central controller that communicates with the MHFE controller 330 for implementing a first set of LFEs on the TOR switches 350-370, while the central controller 320 is the primary central controller that communicates with the MHFE controller 340 for implementing a second set of LFEs on the TOR switches 350-370. The MHFE controller 330 is the master controller for the TOR switches 350 and 360, while the MHFE controller 340 is the master controller for the TOR switch 370.

The TOR switch 350 might implement several logical switches and logical routers (for one or more logical networks), some of which are managed by the central controller 310 and some of which are managed by the central controller 320. Similarly, the TOR switches 360 and 370 might also implement logical switches and routers, some of which are the same logical switches and routers as those implemented by the TOR switch 350, and some of which might not be implemented by the TOR switch 350, depending on to which logical networks the machines that connect to the various TOR switches belong.

As an example, the TOR switch 350 might implement a first logical switch managed by the controller 310 and a second logical switch managed by the controller 320. In this case, the MHFE controller 330 receives logical data for implementing the first logical switch from the controller 310 and logical data for implementing the second logical switch from the controller 320. The MHFE controller then translates this data to a second protocol (a set of database transactions in OVSDB protocol) and distributes the translated data to the TOR switch 350 as described above.

Although in the illustrated example there are only two central controllers in the CCP cluster, each of which is a primary generator and distributor of logical network data for a set of LFEs, one of ordinary skill in the art would realize that a CCP cluster can have many more central controllers across which the responsibilities for management of the logical forwarding elements are sharded. Additionally, one of ordinary skill in the art would realize that there can be many more third-party devices with which a master MHFE controller communicates and the illustrated few number of the master controllers and their corresponding MHFEs are only exemplary and for simplicity of the description.

As described above, in some embodiments, each third-party device that receives logical data from the CCP cluster is assigned as a master MHFE controller, which acts as the intermediary that receives the logical network data in the first protocol (e.g., NETCPA) and converts the data to the second protocol (e.g., OVSDB) for the third-party device. In addition, in some embodiments, each third-party device is assigned a backup MHFE controller, which takes over the responsibilities of the master controller for the third-party device in case the master MHFE controller stops operating. In some embodiments, an MHFE controller may serve as the master controller for a first set of third-party devices and at the same time as a backup controller for a second set of third-party devices.

The master-slave (or primary-backup) relationships between the two MHFE controllers 330-340 and the three third-party TOR switches 350-370 are shown by the dark and light arrowed lines connecting the controllers to the MHFEs. More specifically, this figure shows that while the MHFE controller 330 is the master controller for the TOR switches 350 and 360 (shown by darker connecting lines between the controller and the two TOR switches), it also serves as the backup MHFE controller for the master controller 340. That is, the master MHFE controller 330 serves as a backup MHFE controller for the TOR switch 370 (shown by lighter connecting line between the controller 330 and the TOR switch 370) in case the master MHFE controller 340 ceases to operate for any reason.

Similarly, while the MHFE controller 340 is the master controller for the TOR switch 370 (shown by a darker line connecting the controller and the switch), it also serves as the backup controller for the master controller 330. That is, the master MHFE controller 340 serves as a backup MHFE controller for the TOR switches 350 and 360 (shown by lighter lines connecting the controller to the TOR switches 350 and 360), in case the master MHFE controller 330 ceases to operate. Again, one of ordinary skill in the art would realize that there can be many more third-party devices with which a master MHFE controller communicates and the illustrated master and slave controllers and their corresponding MHFEs are only exemplary. For instance, if a first MHFE controller is the backup for a second MHFE controller, the second MHFE controller is not necessarily a backup controller for the first MHFE controller. A third MHFE controller might be the backup controller for the first MHFE controller in some embodiments.

Figure 4:
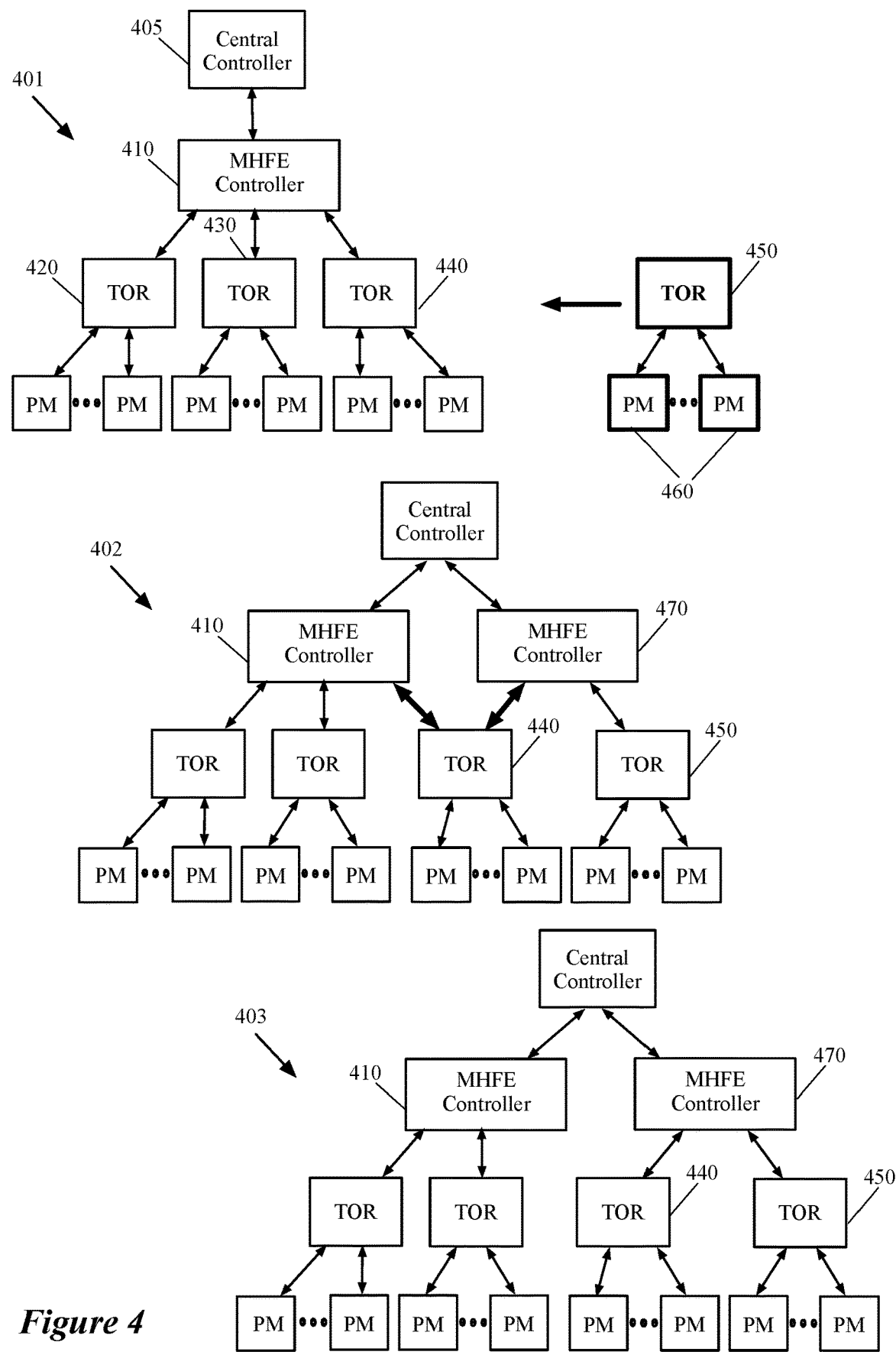
FIG. 4 illustrates an example of adding a new third-party TOR switch to the physical workload connected to one or more logical networks, which causes a rebalancing of the workload of MHFE controllers.

As described above, having each MHFE controller as the master of a limited number of TOR switches, and thereby a limited amount of physical workload to handle, allows for scalability and high availability of a control system. That is, new third-party devices could be added to implement the logical networks by simply adding one or more new MHFE controllers for the new third-party. FIG. 4 illustrates a network control system that adds a new MHFE controller to the control system as soon as the CCP cluster (e.g., a particular central controller in the CCP cluster that is responsible for balancing the workload on the MHFE controllers) realizes that the workload on a particular MHFE controller will be too much to handle if another TOR switch is added to its current workload.

More particularly, FIG. 4 shows, in three different stages 401-403, an example of adding a new third-party TOR switch to the physical workload connected to one or more logical networks, which causes a rebalancing of the workload of MHFE controllers. The figure includes a load balancing central controller 405 of the CCP cluster, an MHFE controller 410, a set of TOR switches 420-440 that are controlled by the MHFE controller 410, and a TOR switch 450. Stage 401 of the figure shows that a set of physical machines 460, which is connected to the TOR switch 450, is going to be added to the physical workload that is managed by the CCP cluster. This happens, for example, when a new logical network for a third-party tenant is being added to the hosting system, or a current tenant of the hosting system adds new physical workload to the tenant's existing logical network(s). This stage also shows that currently, only one MHFE controller 410 is handling the workload produced by three TOR switches 420-440, which are connecting three different sets of physical machines to one or more logical networks that are managed by the CCP cluster.

At stage 402, the figure shows that a new MHFE controller 470 is added to the control system. In some embodiments, the balancing central controller 405 evaluates the workload on the MHFE controllers and adds a new MHFE controller to the control system when the central controller determines that the current number of MHFE controllers is not enough for the physical workload that is managed by the MHFE controllers. Conversely, the balancing central controller of some embodiments removes one of the current MHFE controllers when the workload managed by that MHFE controller is not enough to keep the MHFE controller (i.e., controller application) busy and therefore the light workload can be transferred to another master controller to manage.

The figure at stage 402 shows that the MHFE controller 410 was at its maximum capacity (managing the three TOR switches 420-440) when the new TOR switch was determined to be added to the logical networks managed by the CCP cluster. As such, the balancing central controller 405 decides to add a new MHFE controller 470 for managing the new physical workload connected to the TOR switch 450. At the same time of assigning the new workload to the new MHFE controller 470, the central controller 405 also determines that the workload assigned to the MHFE controllers is not balanced between the current MHFE controller 410 and the newly added MHFE controller 470. Therefore, the central controller changes the mastership of the TOR switch 440 from the MHFE controller 410 to the new MHFE controller 470 in order to maintain the workload balanced between these controllers.

In some embodiments, the central controller 405 sends a mastership assignment message to the MHFE controller 410 to inform this controller of not being the master of TOR switch 440 anymore. At the same time, the central controller 405 sends another mastership assignment message to the MHFE controller 470 to inform this controller of being the new master to manage the TOR switch 440 in addition to the newly added TOR switch 450. However, in the physical network, there is no guaranty that the two MHFE controllers 410 and 470 receive these messages from the central controller 405 at the same time.

Therefore, there is always a possibility that for a brief period of time (i.e., during the transient condition), each of the two MHFE controllers determines that it is the master of the same MHFE. When such a transient condition occurs, both MHFE controllers push database transactions down to the same MHFE, which results in instability in forwarding state of the MHFE. The figure at stage 402 shows such a transient condition, in which, both MHFE controllers 410 and 470 are writing on the same TOR switch 440 at the same time (by showing two highlighted arrowed lines that connect the two controllers to the TOR switch).

At the third stage 403, the figure shows that after the transient condition ends (e.g., within few seconds), the MHFE controller 410 has received the "no master" message from the central controller 405 and as such, has ceased to be the master of the TOR switch 440. As illustrated at this stage, the MHFE controller 470 is now the only master MHFE controller that manages the TOR switch 440. Therefore after the transient condition ends, the MHFE controller 410 is the sole master of the two TOR switches 420 and 430, while the MHFE controller 470 is the sole master of the two TOR switches 440 and 450.

In some embodiments, each MHFE controller sets up a mechanism to detect concurrent distribution of network data and to prevent further instability in the forwarding state in the network (e.g., forwarding state of an MHFE that concurrently receives data from two MHFE controllers). As stated above, a master MHFE controller receives configuration and forwarding data from one or more central controllers of the CCP cluster and converts these data to different sets of database transactions for different database instances created on a set of MHFEs (e.g., hardware switches such as third-party TOR switches) that is managed by the MHFE controller. The MHFE controller then pushes down a set of database transactions using, for example, OVSDB protocol to each hardware switch. These database transactions are applied to one or more tables of the database instance that is created on the hardware switch under a particular database schema (e.g., hardware VTEP database schema, OVSDB schema, etc.).

In order to prevent concurrent writings to the same database instance (e.g., by two different controllers), each MHFE controller of some embodiments monitors the tables of the database instance for any update of the records of the tables. Some embodiments set all of the tables of the database instance to be monitored, while some other embodiments only set monitors for the tables that might be updated by the distributed database transactions. Some embodiments determine which tables of the database might be modified based on the logical network data that the MHFE controller receives from the CCP cluster.

Different embodiments set up monitors on database tables differently. For example, in some embodiments, the controller uses a monitor module that interfaces with the database instance created on the MHFE controller to receive notifications regarding changes to the records of each table of the database instance. The monitor module of different embodiments detects the occurrence of a change in the database instance differently. In some embodiments, the monitor module registers for callbacks with the tables for notification of changes to a record of each table.

Figure 5:
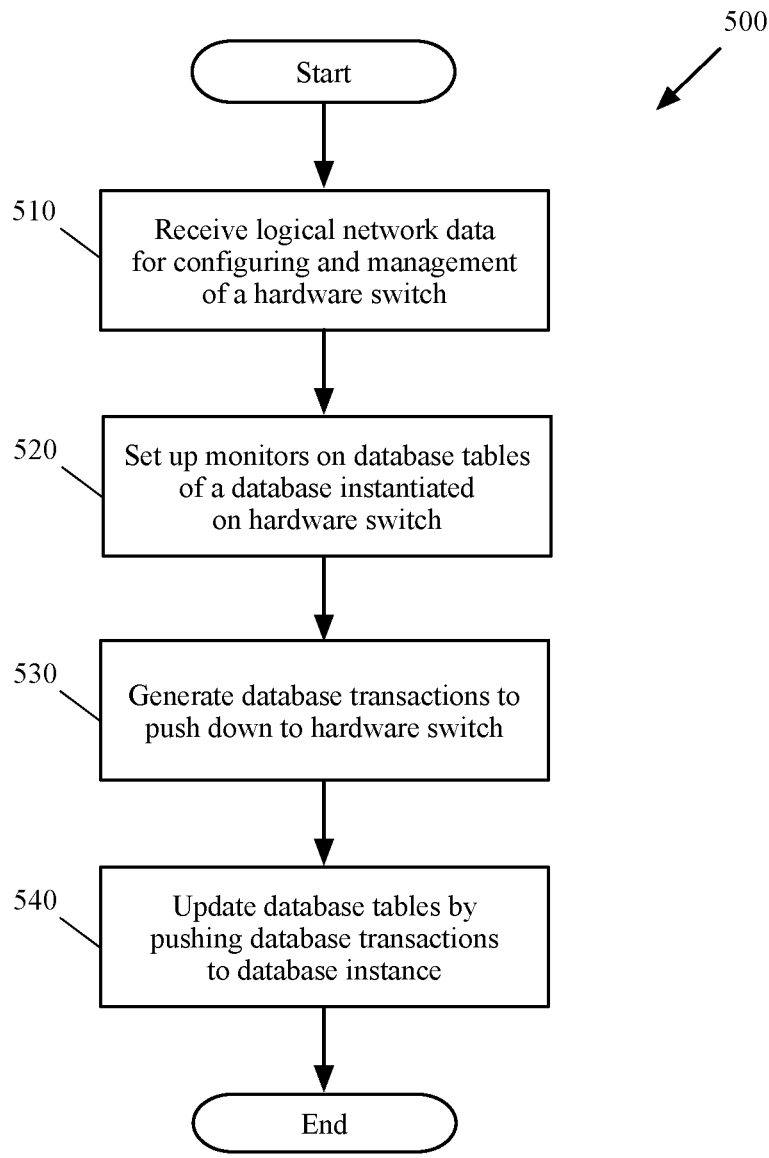
FIG. 5 conceptually illustrates a process of some embodiments for generating and distributing database transactions to an MHFE (e.g., a third-party hardware device).

FIG. 5 conceptually illustrates a process 500 of some embodiments for generating and distributing database transactions to an MHFE (e.g., a third-party hardware device). In some embodiments, process 500 is performed by a master MHFE controller of a hosting system network. As shown, the process 500 begins by receiving (at 510) logical network data for configuring and management of a hardware switch. In some embodiments, the MHFE controller receives logical network data through a proprietary protocol from one or more central controllers of the CCP cluster.

The logical network data received from the CCP cluster contains data (e.g., in form of tables) to implement one or more LFEs (e.g., logical L2 switches, logical L3 routers, etc.) for one or more logical networks. Each logical network, in some embodiments, belongs to a tenant of a hosting system and implemented over the hosting system's physical network. In some embodiments though, a single tenant may have more than one logical network.

At 520, the process sets up monitors on the tables of the database instantiated on the hardware switch. As described above, the process of some embodiments monitors all the tables of the database instance, while in some other embodiments, the process monitors only tables that are to be modified in the database. Some embodiments determine which tables of the database might be modified based on the logical network data that the process receives from the CCP cluster.

The process then generates (at 530) a set of database transactions to push down to the hardware switch. In some embodiments, the MHFE controller translates the received logical network data to the database transactions using an open source protocol (e.g., the OVSDB protocol). The MHFE controller then pushes down the set of database transactions to the hardware switch for which the MHFE controller is a master controller. The database transactions are committed on one or more tables of a database that is instantiated on the hardware switch (e.g., third-party TOR switch) using a database schema (e.g., hardware VTEP database schema, open vSwitch database schema, etc.).

The database tables include different configuration and forwarding data in order for the hardware switch to implement the logical forwarding elements and to establish overlay tunnels to other managed hardware and software forwarding elements. The hardware switch uses the data stored in the tables to exchange the data packets for the logical networks with other managed hardware and software forwarding elements (e.g., third-party TOR switches, hypervisors of host machines, etc.) that also implement the LFEs of the logical networks.

The process 500 then updates (at 540) the tables of the database instance by pushing database transactions down to the database instance created on the hardware switch. The process then ends. Updating the database tables is described in further detail below by reference to FIGS. 7-8. Particularly, these figures will illustrate how the MHFE controllers of some embodiments update the database instances on different hardware switches using a mechanism to ensure that only one MHFE controller modifies the tables of a database instance at any given time.

Some embodiments perform variations of the process 500. The specific operations of the process 500 may not be performed in the exact order shown and described. For example, the process of some embodiments may first generate the database transactions based on the received logical network data and then set up the monitors on different tables of the database instance. Additionally, the specific operations may not be performed in one continuous series of operations, and different specific operations may be performed in different embodiments. For example and as stated above, the operation 540 is performed in multiple different steps, which are described in further detail below by reference to FIGS. 7-8.

Figure 6:
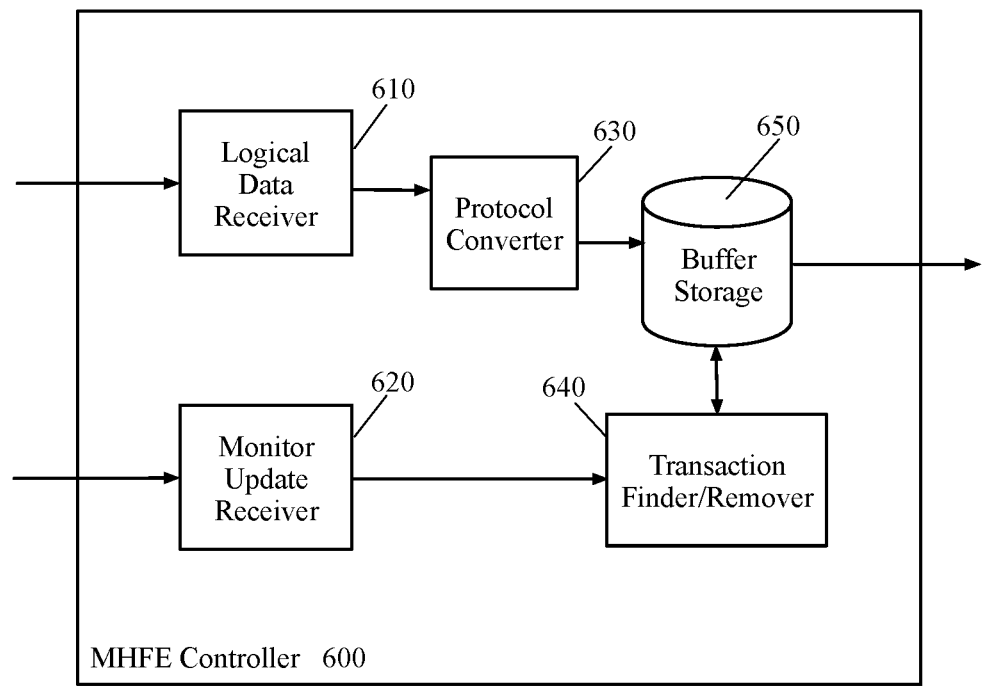
FIG. 6 conceptually illustrates an architecture for an MHFE controller that detects concurrent distribution of logical network data to a hardware switch by different controllers.

FIG. 6 conceptually illustrates an architecture for an MHFE controller 600 that detects concurrent distribution of logical network data to a hardware switch by different controllers. As shown in the figure, the MHFE controller 600 includes a logical data receiver 610, a monitor update receiver 620, a protocol converter 630, a transaction finder/remover 640, and a buffer storage 650. One of ordinary skill in the art will recognize that a master MHFE controller of some embodiments may have many more components, in addition to the enumerated components, that are not depicted in the illustrated example for the simplicity of description. For example, the MHFE controller of some embodiments may additionally have an input interface, a scheduler for scheduling the conversion data for each hardware switch separately, a data mapping engine, an output interface, etc.

In some embodiments, the logical data receiver 610 receives the logical network data for configuring and management of a hardware switch. The logical network data is received from one or more central controllers of the CCP cluster that are responsible for configuring and management of the logical networks that are implemented by the hardware switches mastered by the MHFE controller. As described before, this logical network data contains necessary data to implement one or more LFEs (e.g., logical L2 switches, logical L3 routers, etc.) for one or more logical networks.

The protocol converter 630, in some embodiments, receives the logical network data from the logical data receiver and converts this data to a set of database transactions. As described before, in some embodiments, the data received from the logical data receiver is in a first protocol (e.g., NETCPA protocol), and the protocol converter translates the data to the database transactions in a second, different protocol (e.g., OVSDB protocol). The protocol converter 630 then sends the generated database transactions to the buffer storage 650 for buffering each transaction before distributing the transaction out to the hardware switch.

In some embodiments, the MHFE controller buffers each database transaction before the controller pushes down the database transaction to the hardware switch. As illustrated in this example, the buffer storage 650 of some embodiments is a local storage of the MHFE controller (e.g., a data storage that is on the same controller machine that executes the controller application) that stores each database transaction as a separate record. As described before, the MHFE controller monitors the database tables for any change in their data. When the data in a monitored table of the database instance is changed (e.g., one of the records of the monitored table is updated), the monitor update receiver 620 receives a monitor update from the database instance of the hardware switch.

The monitor update that the monitor update receiver 620 receives from the hardware switch includes the database transaction that has triggered the monitor (i.e., the database transaction by which the monitored table is updated) in some embodiments. The monitor update receiver 620 then sends the transaction in the monitor update to the transaction finder/remover 640. In some embodiments, the transaction finder/remover 640 compares each transaction received from the monitor update receiver against the records stored in the buffer storage 650. When the transaction finder finds a match, the transaction finder/remover 640 removes the record from the buffer storage 650.

However, when no match is found, the transaction finder/remover 640 determines that a transient condition has occurred and the master MHFE controller and another MHFE controller (i.e., a second master controller) are updating the database instance simultaneously. In some embodiment, when the transaction finder/remover 640 determines that a transient condition has occurred, the transaction finder activates a wait and check function in order to prevent further writing on the hardware switch until the MHFE controller determines whether the controller is the master controller of the hardware switch or not. The wait and check function is described in more detail below by reference to FIG. 8.

In some embodiments, the transaction finder/remover 640 removes a database transaction from the buffer storage 650 when the received monitor update matches the database transaction, irrespective of the database instance being updated by the MHFE controller that has received the monitor update, or by another controller. This is because the committed transaction is the same transaction that the MHFE controller has originally pushed down to the hardware switch and therefor the identity of the MHFE controller that has updated the database instance becomes irrelevant. In other words, when two MHFE controllers have pushed down the same database transaction to the hardware device, it is not important that the database instance is updated by which one of the controllers.

Figure 7:
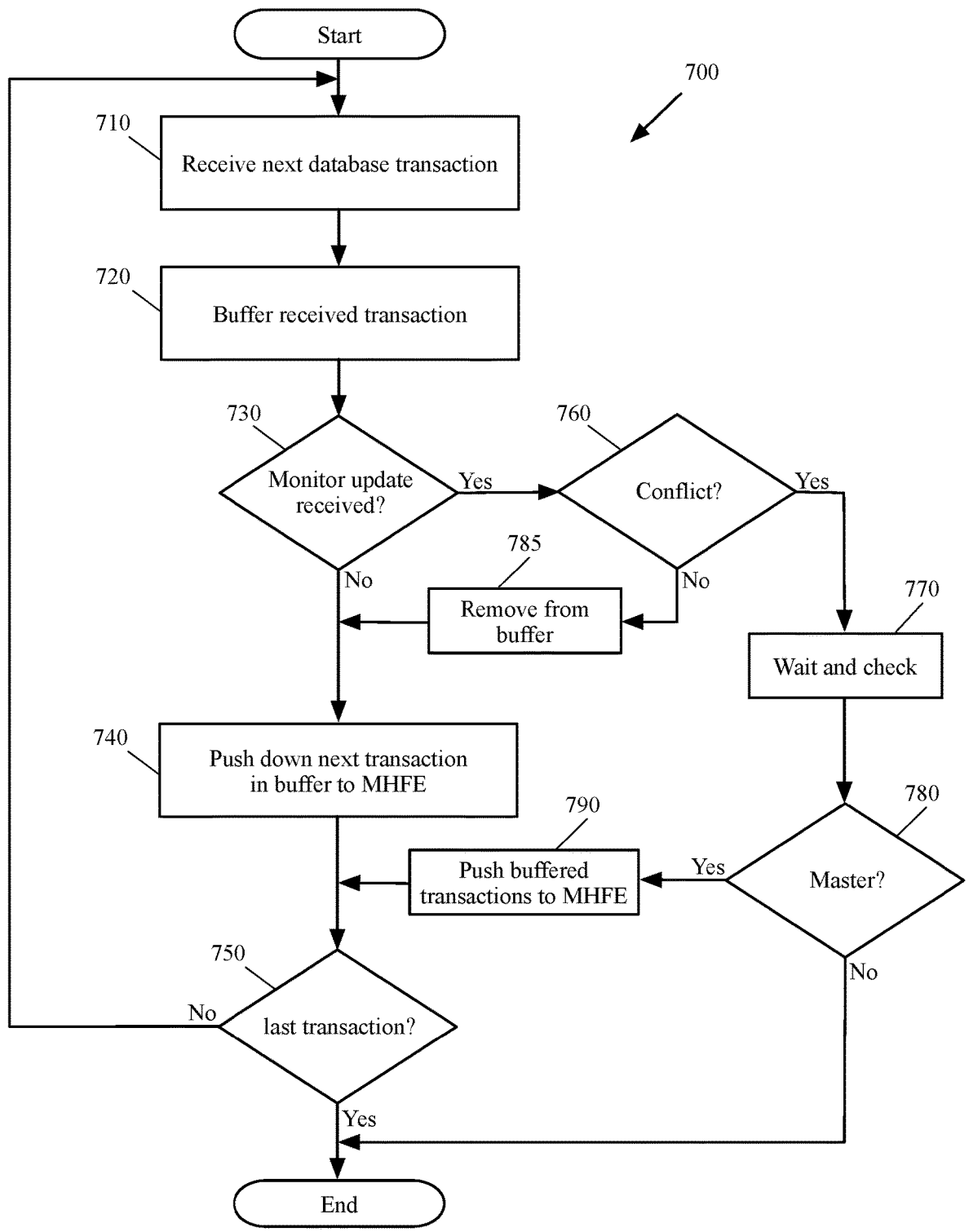
FIG. 7 conceptually illustrates a process that the MHFE controller of some embodiments performs in order to prevent concurrent distribution of logical network data to the same hardware switch.

FIG. 7 conceptually illustrates a process 700 that the MHFE controller of some embodiments performs in order to prevent concurrent distribution of logical network data to the same hardware switch. The process starts by receiving (at 710) the next database transaction in the set of database transactions generated by the MHFE controller. The process then buffers (at 720) the received database transaction in a local buffer storage of the controller.

After buffering the received database transaction, the process of some embodiments determines (at 730) whether a new monitor update has been received from the hardware switch. That is, the process checks for any new monitor update which is an indication of a change in one of the records of one of the database tables stored on the hardware switch. In other words, the monitor update message received from the hardware switch indicates that a database transaction has been committed on one of the database tables of the switch.

If the process determines that no monitor update has been received from the hardware switch (i.e., from the database instance generated on the hardware switch), the process pushes down (at 740) the received and buffered database transaction to the hardware switch. That is, the process modifies the data in one of the tables of the database instance (e.g., adds a new record to the table, modifies an existing record of the table, etc.).

The process 700 then determines (at 750) whether there are more database transactions in the set of database transactions that is generated by the MHFE controller (i.e., logical network data that is converted from the first protocol to the second protocol). If the process determines that the processed transaction was the last transaction in the set, the process ends. On the other hand, if the process 700 determines that there are still more database transactions that should be pushed down to the hardware switch, the process returns to operation 710 to receive the next database transaction and repeat the required operations on the next database transaction.

In some embodiments, when the process 700 determines (at 730) that a monitor update is received (from the hardware switch), the process determines (at 760) whether there is a conflict between the database transaction in the received monitor update and the buffered database transactions stored in the local storage of the MHFE controller. That is, the process matches the database transaction in the received monitor update against the locally stored database transactions and when a match is found, the database transaction determines that there is no conflict. In some embodiments, when no conflict is found, the process removes (at 785) the matched database transaction from the local storage of the MHFE controller. The process then proceeds to operation 740 in order to push down the previously received and buffered database transaction to the hardware switch.

On the other hand, if the process determines (at 760) that there is a conflict between the database transaction in the received monitor update and the buffered database transactions stored in the local storage of the MHFE controller, the process activates (at 770) the wait and check function. That is, when no match is found between the database transaction received in the monitor update and any of the buffered database transactions, the process of some embodiments realizes that the control system is in a transient condition and two master MHFE controllers are updating the database instance of the hardware switch.

As such, in some embodiments, the process stops sending more transactions down to the hardware switch and waits for a predetermined amount of time until the transient condition passes. During the waiting time, the process of some embodiments (i) only buffers the next transactions received in the set of database transactions, and (ii) checks the newly received monitor updates to determine whether more conflicts between the transactions of the received monitor updates and the buffered transactions exist.

In some embodiments, the wait and check function of operation 770 clarifies whether the MHFE controller is still the master controller of the hardware switch, or another master controller for the hardware switch is assigned and the MHFE controller should concede and hand over the mastership of the hardware switch to the other master MHFE controller. The wait and check function is described in more detail below by reference to FIG. 8. Hence, after the transient condition passes (i.e., after the wait and check function ends), the process determines (at 780) whether the MHFE controller is still the master controller of the hardware switch or another MHFE controller has taken over the mastership of the switch.

When the process determines that the MHFE controller is still the master controller of the hardware switch, the process pushes (at 790) all the buffered database transactions during the wait and check operation, down to the hardware switch. The process then proceeds to operation 750 to determine whether there are more database transactions in the set of database transactions that is generated by the MHFE controller. On the other hand, when the process determines that the MHFE controller is not the master controller of the hardware switch and the other MHFE controller that is writing on the hardware switch has become the new master of the switch, the process ends.

Some embodiments perform variations of the process 700. The specific operations of the process 700 may not be performed in the exact order shown and described. Additionally, the specific operations may not be performed in one continuous series of operations, and different specific operations may be performed in different embodiments. For example, in some embodiments that support multitasking performed by multiple processors, the process can be divided to at least two different processes that run in parallel. The first process receives the database transactions, buffers the transactions, and pushes them down to the hardware switch, while the second process watches for monitor updates and handling the conflictions.

In some embodiments, when the master MHFE controller realizes that a transient condition has occurred (i.e., two controllers are concurrently updating the logical network data on the same MHFE), the master controller that has received the update monitor halts the distribution of logical network data to the hardware switch for a predetermined amount of time. As described above, the transient condition lasts for a very short period of time (e.g., few seconds) and as soon as one of the controllers receives the message (from the central controller) that indicates the MHFE controller is not the master of the same hardware switch anymore, the controller stops distributing additional network data to the hardware switch. Therefore, during the transient condition, each controller ceases distributing data transactions for a preset time and only buffers the database transactions.

In some embodiments, the MHFE controller uses an exponential back off mechanism during the predetermined time period. That is, the MHFE controller of some embodiments halts the distribution of data for a first amount of time (e.g., 2 seconds) and then determines again whether the MHFE is still being updated by another controller. If the controller determines that another controller is still updating the MHFE, the controller continues on halting the distribution for a second amount of time (e.g., 4 seconds). In some embodiments, the controller continues this wait and check mechanism for a predetermined amount of time (e.g., 8 second, 16 seconds, etc.). During this preset period of time, one of the controllers most likely receives the message that indicates the controller is not the master of MHFEs. In some embodiments, if the controller does not receive the message during the preset period, the controller determines that it is not the master of the MHFEs and stops delivering more transactions to the MHFEs.

Figure 8:
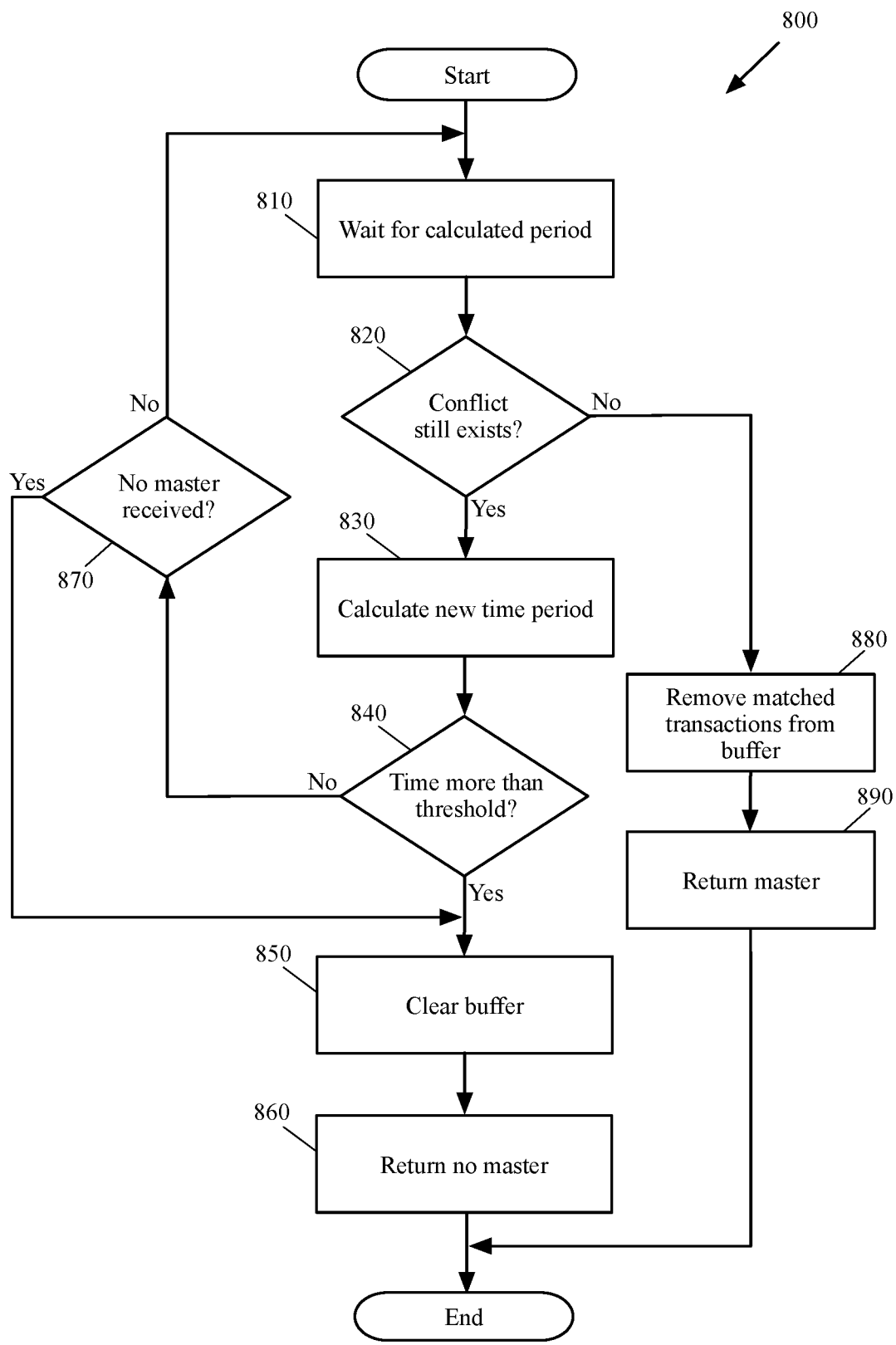
FIG. 8 conceptually illustrates a process that the MHFE controller of some embodiments performs in order to execute the wait and check function during the transient condition.

FIG. 8 conceptually illustrates a process 800 that the MHFE controller of some embodiments performs in order to execute the wait and check function during the transient condition. The process starts by staying (at 810) idle for an initial period of time. This is because, at this point, the process has realized that the mastership change is in a transient condition and two different MHFE controllers are writing into the same database instance at the same time. As a result, the MHFE controller that has received the conflicting monitor update (i.e., the monitor update that includes a database transaction that does not match any of the buffered transactions), has activated the wait and check process.

After the initial period of time lapses, the process 800 determines (at 820) whether more conflicts still exist. Different embodiments check for the existence of more conflicts differently. Some embodiments determine that more conflicts exist when the next received monitor update carries a database transaction that does not match any of the buffered database transactions. Some other embodiments determine that more conflicts exist when a particular number of subsequent monitor updates (e.g., the next three monitor updates, the next five monitor updates, etc.) include conflicting database transactions. In some such embodiments, receiving only one subsequent transaction that matches the buffer is not a proper indication for nonexistence of transient condition since the transactions of the other master controller might arrive at the hardware switch with a slower rate.

When the process 800 determines (at 820) that no more conflicts exists, the process proceeds to operation 880, which is described below. On the other hand, when the process determines that a conflict still exists, the process calculates a new time period for staying idle. As described above, the process of some embodiments uses an exponential back off mechanism with a threshold cap time. That is, in some embodiments, the process uses the result of an exponentiation with a number (e.g., number two) as the base and an integer n (n being from 0 to a threshold number) as the exponent to determine the idle time. For example, the process determines the initial idle time (at 810), as 1 second ($2^0$).

When the process determines that a conflict still exists, the process calculates (at 830) a new idle time (e.g., by increasing the value of the exponent). Therefore the process adds one to the exponent and comes up with a new idle time of 2 seconds ($2^1$). The process then determines (at 840) whether the new calculates idle time is bigger than the threshold period. When the process determines that the new calculates idle time is still within the threshold period, the process determines (at 840) whether a message indicating that the MHFE controller is not the master of the hardware switch is received from the CCP cluster. If such a message is received from a central controller, the process proceeds to operation 850 which is described below. When the process determines that no such message is received from the central controller the process returns to operation 810 to stay idle for the new calculated time period.

In some embodiments, the controller continues this wait and check mechanism for a predetermined amount of time (e.g., 8 second, 16 seconds, etc.). During this preset period of time, one of the controllers most likely receives the message that indicates the controller is not the master of the hardware switch. In some embodiments, when the process determines (at 840) that the new calculated idle time is bigger than the threshold time period (i.e., the preset time period is passed), the process concludes that the MHFE controller is not the master of the hardware switch. In some such embodiments, the process clears (at 850) the buffer from all of the stored transactions and indicates (at 860) to the MHFE controller that the controller is not the master of the switch any more. The process then ends.

When the process 800 determines (at 820) that no more conflicts exists, the process removes (at 880) all the database transactions (in the set of received monitor updates) that matched the buffered transactions, from the buffer storage. The process then indicates (at 890) to the MHFE controller that the controller is still the master of the hardware switch. The process then ends.

Some embodiments perform variations of the process 800. The specific operations of the process 800 may not be performed in the exact order shown and described. Additionally, the specific operations may not be performed in one continuous series of operations, and different specific operations may be performed in different embodiments.

Figure 9:
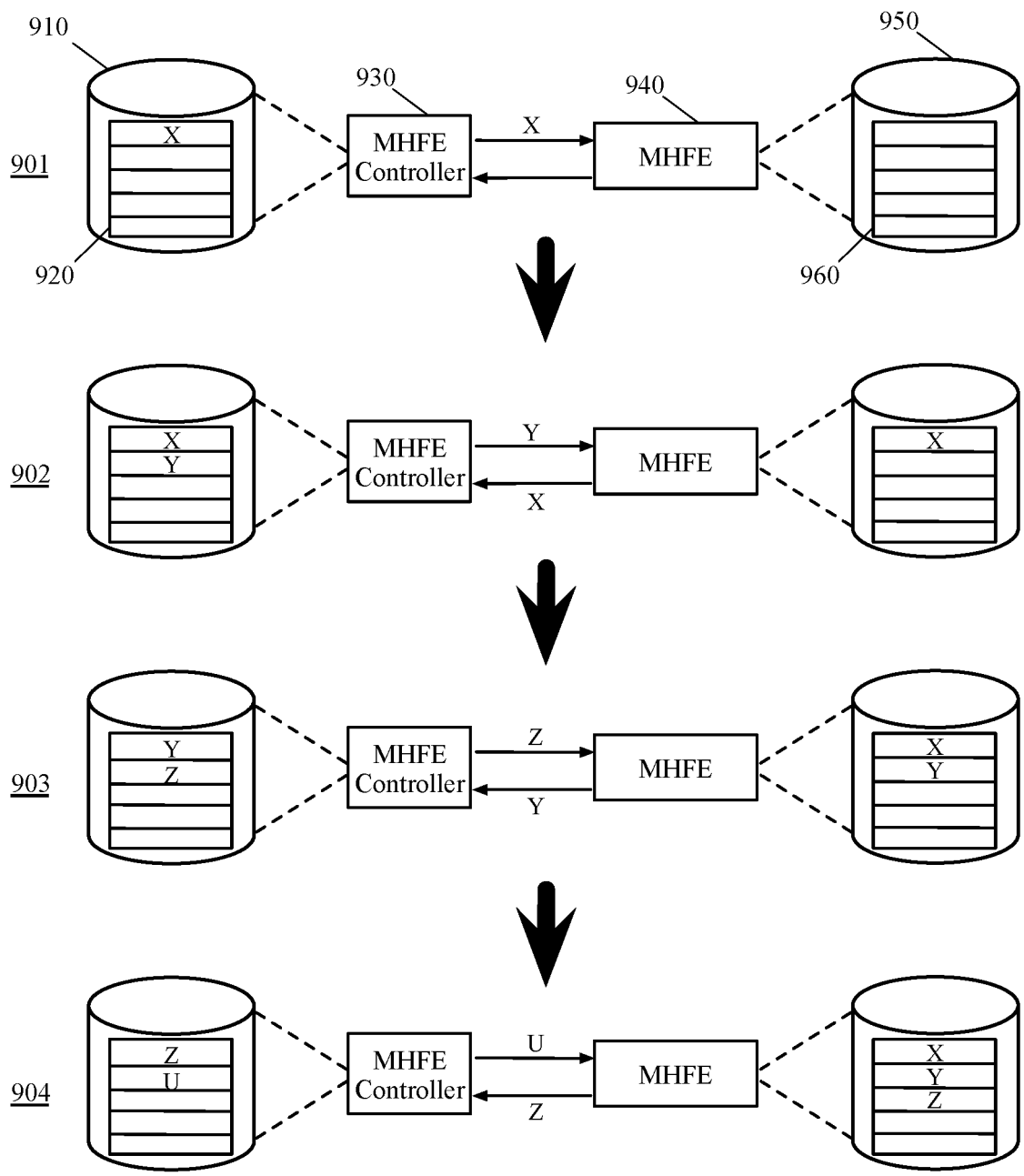
FIG. 9 illustrates an example of a master MHFE controller buffering and pushing database transactions to a hardware switch, and receiving monitor updates from the hardware switch.

FIG. 9 illustrates an example of a master MHFE controller buffering and pushing database transactions to a hardware switch, and receiving monitor updates from the hardware switch. More specifically, this figure shows, through four stages 901-904, how a master MHFE controller buffers each received database transaction and pushes the transaction into the database instance on the hardware switch. The figure also illustrates that how the MHFE controller removes a matched transaction from the buffered storage after the commitment of the transaction is confirmed by the hardware switch.

FIG. 9 illustrates a local buffer storage 910 of a master MHFE controller 930 and a database instance storage 950 that is instantiated on the MHFE 940 (e.g., a third-party TOR switch). The buffer storage 910 includes a buffer table 920 and one of the tables of the database instance storage 950 is the database table 960.

At stage 901 the figure shows that the MHFE controller has stored a database transaction X (e.g., X is a new record that is to be added to one of the database tables of the hardware switch) in the buffer table 920 of the local buffer storage. This stage also shows that after buffering the database transaction X, the controller pushes the transaction down to the hardware switch 940.

At the second stage 902, the figure shows that the database transaction X is saved in the database table 960 of the database instance storage 950 on the hardware switch. A monitor update that includes the saved transaction X is also being sent to the MHFE controller to confirm the commitment of the transaction. This stage also shows that the MHFE controller stores another database transaction Y in the buffer table 920 of the local buffer storage and pushes the transaction down to the hardware switch 940. As described above, the database transactions X and Y are among the transactions in the set of database transactions that are generated from the logical network data the MHFE controller receives from the CCP cluster.

At stage 903, the figure shows that the database transaction Y is saved in the database table 960 of the database instance storage 950 on the hardware switch. The figure also shows that as a result of receiving the monitor update that includes the saved transaction X from the hardware switch, the MHFE controller has matched this transaction against the buffered transaction X and therefore removed this transaction from the buffer storage. Additionally, the stage 903 shows that the MHFE controller stores a third database transaction Z in the buffer table 920 and pushes this transaction down to the hardware switch 940, while the controller receives a monitor update that carries the transaction Y from the hardware switch which confirms that this transaction is also saved in the database table 960.

At stage 904, the figure shows that the database transaction Z is saved in the database table 960 of the database instance storage 950 on the hardware switch. The figure also shows that as a result of receiving the monitor update that carries the saved transaction Y from the hardware switch, the MHFE controller has matched this transaction against the buffered transaction Y and therefore removed this transaction from the buffer storage. Additionally, this stage shows that the MHFE controller stores a fourth database transaction U in the buffer table 920 and pushes this transaction down to the hardware switch 940, while the controller receives a monitor update that carries the transaction Z from the hardware switch which confirms that this transaction is also saved in the database table 960.

One of ordinary skill in the art would realize that the database table 960 is only of the tables of the database instance stored in the database instance storage 950 and the database instance includes many other tables that are not shown for simplicity of the description. Additionally, it should be understood that in the illustrated example all the transactions are saved in and all of the monitor updates are received from only one database table in order to simplify the description. In real networks, each transaction that the MHFE controller pushes to the hardware switch might be applied to a different table of the database instance. Similarly, each monitor update that the MHFE controller receives from the hardware switch might be initiated by a different database table. Lastly, although all the database transactions in the above-described example are shown as new record transactions that are added to the database table, in reality, the database transactions might be any other transaction such as updating the records of the tables.

Figure 10:
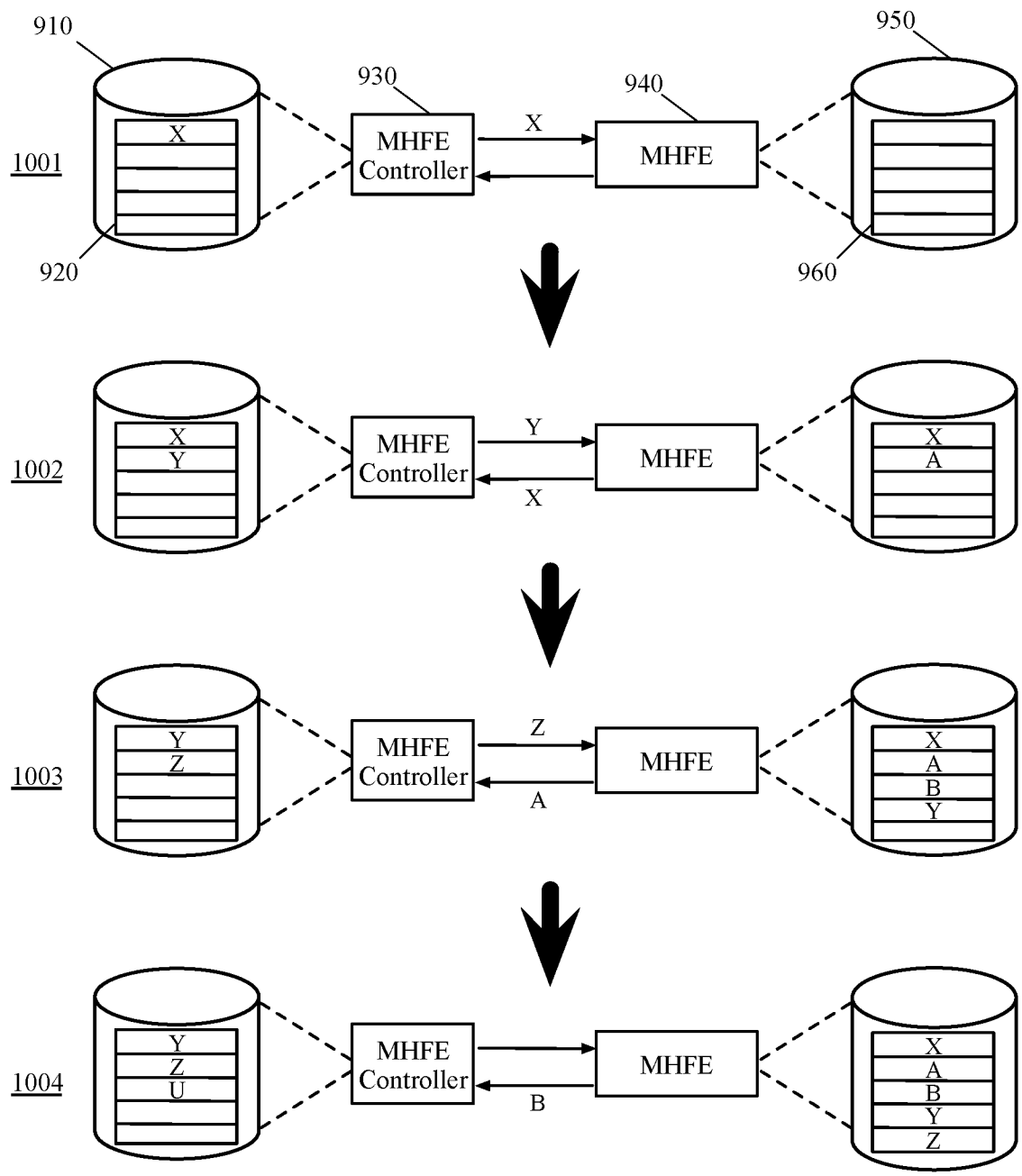
FIG. 10 illustrates an example of a master MHFE controller that detects a concurrent writing on a hardware switch, while buffering and pushing database transactions to the hardware switch.

In the above-described example, the master MHFE controller is the only controller that is writing into the database instance of the hardware switch and therefore, the MHFE controller did not halt the distribution of the database transactions to the hardware switch at any point of time. FIG. 10, however, illustrates an example of a master MHFE controller that detects a concurrent writing on a hardware switch, while buffering and pushing database transactions to the hardware switch.

More specifically, FIG. 10 shows, through four stages 1001-1004, how a master MHFE controller buffers each received database transaction and pushes the transaction into the database instance on the hardware switch. The figure also illustrates that how the MHFE controller detects a conflict in between the sent transactions to the hardware switch and the received monitor updates from the hardware switch. All the network elements shown in this figure are similar to the ones described above in FIG. 9.

Similar to the first stage of FIG. 9, at the first stage 1001 the figure shows that the MHFE controller has stored a database transaction X in the buffer table 920 of the MHFE controller's local buffer storage 910. This stage also shows that after buffering the database transaction X, the MHFE controller pushes the database transaction down to the hardware switch 940.

At the second stage 1002, the figure shows that the database transaction X is saved in the database table 960 of the database instance storage 950 on the hardware switch. However, this stage also shows that a subsequent transaction A is also saved in the database table immediately after the transaction X. This is because a second MHFE controller has determined that it is the master controller of the hardware switch (e.g., by receiving a mastership assignment message from a balancing central controller, or alternatively by not receiving a non-mastership message from the central controller). As such, during this transient situation, two MHFE controllers are writing on the hardware switch simultaneously.

The second stage 1002 further shows that a monitor update that carries the saved transaction X is being sent to the MHFE controller to confirm that this transaction is committed. This stage also shows that the MHFE controller stores another database transaction Y in the buffer table 920 of the local buffer storage and pushes the transaction down to the hardware switch 940.

At stage 1003, the figure shows that the database transaction Y is saved in the database table 960 of the database instance storage 950 on the hardware switch. However, as shown, between the database transactions X and Y, two other transactions A and B are saved (by the second MHFE controller) in the database table. This stage also shows that as a result of receiving the monitor update that includes the saved transaction X from the hardware switch, the MHFE controller has matched this transaction against the buffered transaction X and therefore removed this transaction from the buffer storage. Additionally, the stage 1003 shows that the MHFE controller stores a third database transaction Z in the buffer table 920 and pushes this transaction down to the hardware switch 940. Lastly, the controller receives a monitor update from the hardware switch that carries the transaction A, which is the next transaction after transaction X in the database table 960.

At stage 1004, the figure shows that the database transaction Z is saved in the database table 960 of the database instance storage 950 on the hardware switch. The figure also shows that as a result of receiving the monitor update that carries the saved transaction A from the hardware switch, the MHFE controller has realized that a transient situation has occurred and a second MHFE controller is writing on the hardware switch. This is because the MHFE controller matches transaction A against the buffered transactions Y and Z and does not find a match in the table. As such, even though the MHFE controller continues to buffer new transactions (i.e., transaction U) in the buffer table, the controller has ceased sending the buffered transactions to the hardware switch.

As described above, this transient conditions lasts only for a maximum of few seconds and after the condition ends, the MHFE controller either continues on managing the hardware switch, or hands over the management to the second MHFE controller in the manner described above by reference to FIGS. 7 and 8. The fourth stage 1004 also shows that although the MHFE controller has stopped distribution of logical data to the hardware switch, the controller receives a monitor update that carries the next transaction B from the hardware switch, which confirms that this database transaction is the next database transaction that is saved in the database table 960.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
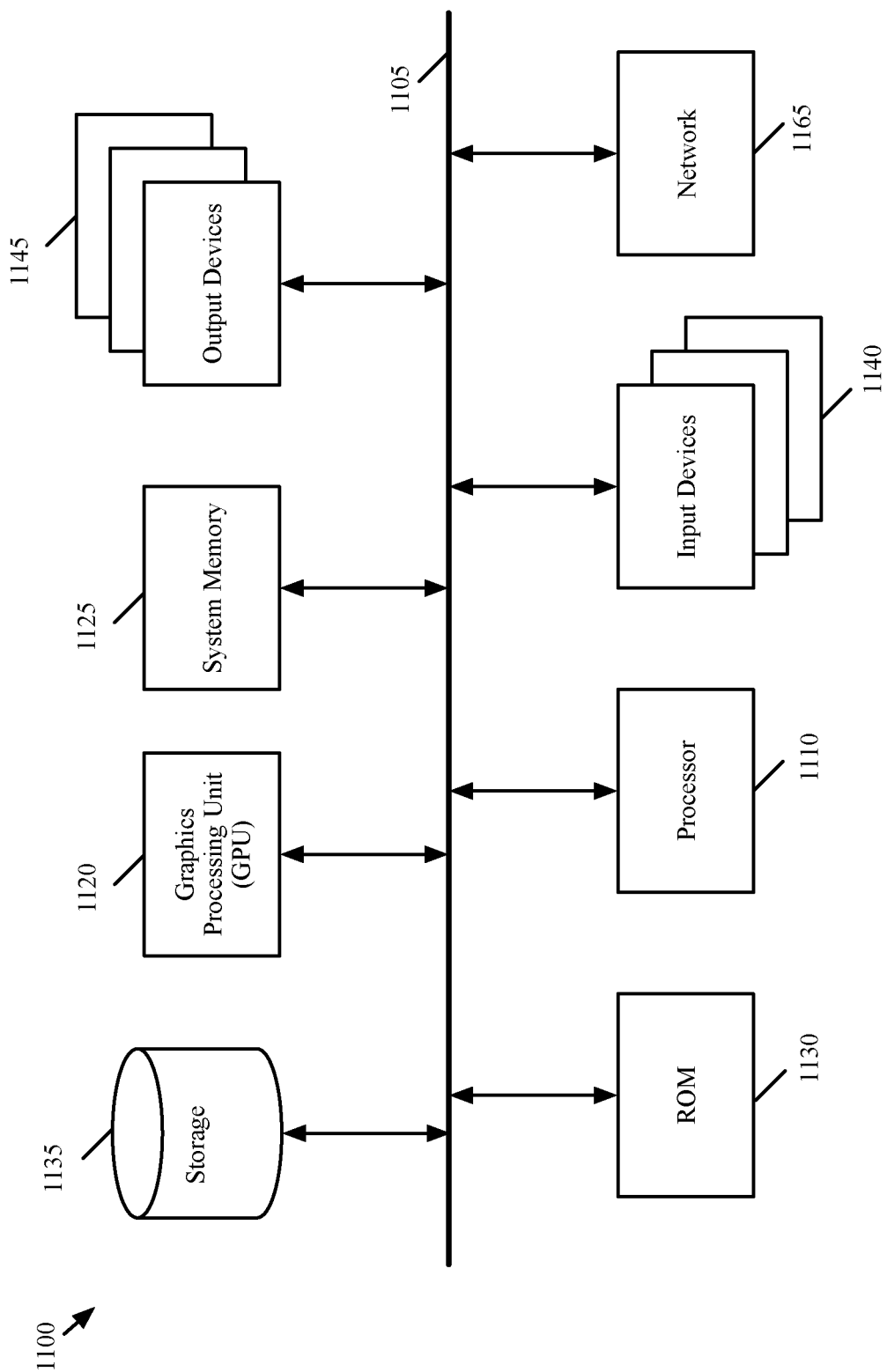
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding drive) as the permanent storage device. Like the permanent storage device 1135, the system memory 1125 is a read-and-write memory device. However, unlike storage device 1135, the system memory 1125 is a volatile read-and-write memory, such a random access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 5, 7, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for managing a managed hardware forwarding element (MHFE) to implement one or more logical networks, the method comprising:
at a first controller application:
receiving logical network data defining at least one logical forwarding element of a logical network for implementation by the MHFE;
identifying a set of one or more database tables that is associated with the received logical network data and that belongs to a database instance that is instantiated on the MHFE;
monitoring the identified set of database tables in order to determine whether a second controller application updates any one of the set of database tables; and
when a determination is made based on the monitoring that updates have not been received for the identified set of database tables, distributing the logical network data to the MHFE.

2. The method of claim 1, wherein the distributed logical network data comprises a set of database transactions, wherein distributing the logical network data to the WIFE comprises buffering each database transaction in a local storage before pushing the database transaction to the MHFE.

3. The method of claim 2, wherein monitoring the identified set of database tables further comprises:
receiving a monitor update comprising a database transaction that has been applied to at least one database table in the set of database tables by the second network controller; and
determining if the received database transaction for the at least one database table matches any of the buffered database transactions, wherein
when the received database transaction does not match any of the buffered database transactions, determining that the second controller application is updating the database instance simultaneously with the first controller application; and
when the received database transaction does match a particular buffered database transaction, removing the particular buffered database transaction from the local storage to prevent concurrent updates to the same MHFE.

4. The method of claim 3 further comprising, when the database instance is determined to be updated simultaneously by the second controller application:
halting the distribution of the logical network data to the MHFE for a predetermined period of time;
determining whether the second controller application is still updating any database table in the set of database tables after the predetermined period of time lapses; and when the set of database tables is determined based on the monitoring not to be receiving updates, continuing on distributing the logical network data to the MHFE.

5. The method of claim 4 further comprising buffering new database transactions in the local storage of the MHFE during the predetermined amount of time.

6. The method of claim 4 further comprising, when the set of database tables is determined to be still updated by the second controller application after the predetermined amount of time, iteratively, within a threshold time period, (i) extending the predetermined amount of time and (ii) determining whether the second controller application is still updating any one of the set of database tables after the extended amount of time lapses.

7. The method of claim 1, wherein the MHFE implements the logical forwarding element of the logical network in order to logically connect at least one physical machine that connects to the MHFE to at least one other machine that connects to a different managed forwarding element.

8. The method of claim 1, wherein the first controller application receives the logical network data from a third controller application using a first protocol, and distributes the logical network data to the MHFE using a second protocol recognizable by the MHFE.

9. The method of claim 8, wherein the third controller application is one of a plurality of controller applications that form a central control plane cluster that computes data to implement different logical networks for different tenants of a hosting system.

10. The method of claim 8, wherein the first, second, and third controller applications are executed by separate controller computers.

11. The method of claim 1, wherein the MHFE comprises a third-party top of rack switch to which a plurality of physical machines connect.

12. The method of claim 1, wherein the logical network data comprises forwarding tables that specify forwarding behaviors of the at least one logical forwarding element of the logical network that is implemented by the MHFE.

13. The method of claim 12, wherein the logical network data further comprises configuration data that defines a tunnel between the MHFE and a different managed forwarding element in order to exchange the logical network traffic.

14. A non-transitory machine readable medium for storing a first controller program which when executed by at least one processing unit manages a managed hardware forwarding element (MHFE) to implement one or more logical networks, the first controller program comprising sets of instructions for:
receiving logical network data defining at least one logical forwarding element of a logical network for implementation by the MHFE;
identifying a set of one or more database tables that is associated with the received logical network data and that belongs to a database instance that is instantiated on the MHFE;
monitoring the identified set of database tables in order to determine whether a second controller computer updates any one of the set of database tables; and
when a determination is made based on the monitoring that updates have not been received for the identified set of database tables, distributing the logical network data to the MHFE.

15. The non-transitory machine readable medium of claim 14, wherein the distributed logical network data comprises a set of database transactions, wherein the set of instructions for distributing the logical network data to the MHFE comprises a set of instructions for buffering each database transaction in a local storage before pushing the database transaction to the MHFE.

16. The non-transitory machine readable medium of claim 15, wherein the set of instructions for monitoring the identified set of database tables further comprises sets of instructions for:
receiving a monitor update comprising a database transaction that has been applied to at least one database table in the set of database tables by the second network controller; and
determining if the received database transaction for the at least one database table matches any of the buffered database transactions, wherein
when the received database transaction does not match any of the buffered database transactions, determining that the second controller application is updating the database instance simultaneously with the first controller application; and
when the received database transaction does match a particular buffered database transaction, removing the particular database transaction from the local storage to prevent concurrent updates to the same MHFE.

17. The non-transitory machine readable medium of claim 14, wherein the WIFE comprises a third-party top of rack switch to which a plurality of physical machines connect.

18. The non-transitory machine readable medium of claim 14, wherein the set of instructions for receiving the logical network data further comprises a set of instruction for receiving the logical network data from a third controller computer using a first protocol, wherein the set of instructions for distributing the logical network data to the MHFE further comprises a set of instructions for distributing the logical network data to the MHFE using a second protocol recognizable by the WIFE.

19. The non-transitory machine readable medium of claim 18, wherein the third controller computer is one of a plurality of controller computers that form a central control plane cluster that computes data to implement different logical networks for different tenants of a hosting system.

20. The non-transitory machine readable medium of claim 14, wherein the logical network data comprises forwarding tables that specify forwarding behaviors of the at least one logical forwarding element of the logical network that is implemented by the MHFE.

* * * * *